(12) United States Patent
John et al.

(10) Patent No.: US 10,391,708 B2
(45) Date of Patent: Aug. 27, 2019

(54) METHOD AND DEVICE FOR PRODUCING A THREE-DIMENSIONAL OBJECT AND EXPOSURE MASK GENERATING APPARATUS

(71) Applicant: Schultheiss GmbH, Heimsheim (DE)

(72) Inventors: Hendrik John, Salzgitter-Bad (DE); Andreas Schultheiss, Muehlacker (DE)

(73) Assignee: Schultheiss GmbH, Heimsheim (DE)

( * ) Notice: Subject to any disclaimer, the term of this patent is extended or adjusted under 35 U.S.C. 154(b) by 698 days.

(21) Appl. No.: 14/994,427

(22) Filed: Jan. 13, 2016

(65) Prior Publication Data

US 2016/0221267 A1 Aug. 4, 2016

Related U.S. Application Data

(63) Continuation of application No. PCT/EP2014/065232, filed on Jul. 16, 2014.

(30) Foreign Application Priority Data

Jul. 16, 2013 (DE) .................. 10 2013 107 568

(51) Int. Cl.
*B29C 67/00* (2017.01)
*B29C 64/386* (2017.01)
(Continued)

(52) U.S. Cl.
CPC .......... *B29C 64/386* (2017.08); *B29C 64/129* (2017.08); *B33Y 10/00* (2014.12); *B33Y 30/00* (2014.12); *B33Y 50/02* (2014.12)

(58) Field of Classification Search
CPC ... B29C 64/129; B29C 64/124; B29C 64/386; B33Y 50/02; B33Y 30/00; B33Y 10/00
See application file for complete search history.

(56) References Cited

U.S. PATENT DOCUMENTS

| | | |
|---|---|---|
| 5,545,367 A | 8/1996 | Bae et al. |
| 5,693,144 A | 12/1997 | Jacobs et al. |

(Continued)

FOREIGN PATENT DOCUMENTS

| | | |
|---|---|---|
| DE | 19929199 | 1/2001 |
| DE | 102004022961 | 12/2005 |

(Continued)

OTHER PUBLICATIONS

International Search Report for corresponding application PCT/EP2014/065232 dated Nov. 3, 2014, 3 pages.

*Primary Examiner* — Anthony Calandra
*Assistant Examiner* — Jerzi H Moreno Hernandez
(74) *Attorney, Agent, or Firm* — Lipsitz & McAllister, LLC

(57) ABSTRACT

A method for producing a three-dimensional object by layer by layer solidifying of a material which is solidifiable under the action of radiation is provided. The method makes use of exposure masks. In order to form each object layer to be solidified of the object in a construction plane, there is generated at least one, preferably a single, digital exposure mask by means of which the radiation is selectively projected into the construction plane. For each exposure mask, according to the object layer to be solidified, a single 2-bit bitmap is calculated which assigns either the bit-value "transparent" or the bit-value "non-transparent" to each pixel of the exposure mask. In addition, an improved exposure mask generating apparatus and an improved device for producing a three-dimensional object are proposed.

20 Claims, 15 Drawing Sheets

(51) Int. Cl.
*B29C 64/129* (2017.01)
*B33Y 10/00* (2015.01)
*B33Y 30/00* (2015.01)
*B33Y 50/02* (2015.01)

(56) References Cited

U.S. PATENT DOCUMENTS

| | | | |
|---|---|---|---|
| 6,051,179 A * | 4/2000 | Hagenau | B33Y 30/00 264/401 |
| 6,054,192 A | 4/2000 | Otsuka et al. | |
| 7,783,371 B2 | 8/2010 | John et al. | |
| 7,790,093 B2 | 9/2010 | Shkolnik et al. | |
| 7,894,921 B2 | 2/2011 | John et al. | |
| 7,962,238 B2 | 6/2011 | Shkolnik et al. | |
| 8,126,580 B2 | 2/2012 | El-Siblani et al. | |
| RE43,955 E | 2/2013 | Shkolnik et al. | |
| 8,815,143 B2 | 8/2014 | John et al. | |
| 8,862,260 B2 | 10/2014 | Shkolnik et al. | |
| 2001/0048184 A1 * | 12/2001 | Ueno | B33Y 10/00 264/401 |
| 2005/0248062 A1 | 11/2005 | Shkolnik et al. | |
| 2006/0161287 A1 * | 7/2006 | Simonis | A61C 13/0004 700/120 |
| 2007/0260349 A1 | 11/2007 | John et al. | |
| 2008/0021586 A1 * | 1/2008 | Schillen | B33Y 50/02 700/120 |
| 2008/0038396 A1 | 2/2008 | John et al. | |
| 2008/0054531 A1 * | 3/2008 | Kerekes | B33Y 80/00 264/401 |
| 2010/0125356 A1 * | 5/2010 | Shkolnik | G06T 1/00 700/98 |
| 2010/0249979 A1 | 9/2010 | John et al. | |
| 2010/0262272 A1 * | 10/2010 | Shkolnik | B33Y 30/00 700/120 |
| 2010/0283188 A1 | 11/2010 | Rohner et al. | |
| 2011/0009992 A1 | 1/2011 | Shkolnik et al. | |
| 2011/0101570 A1 | 5/2011 | John et al. | |
| 2011/0196529 A1 | 8/2011 | Shkolnik et al. | |
| 2013/0295215 A1 * | 11/2013 | Wu | B29C 67/0059 425/174.4 |

FOREIGN PATENT DOCUMENTS

| | | |
|---|---|---|
| DE | 102006019963 | 10/2007 |
| EP | 0856393 | 8/1998 |
| EP | 1849586 | 10/2007 |
| EP | 1849587 | 10/2007 |
| EP | 2072223 | 6/2009 |
| EP | 2251185 | 11/2010 |
| WO | 96/00422 | 1/1996 |
| WO | 2005/110722 | 11/2005 |

* cited by examiner

FIG.6
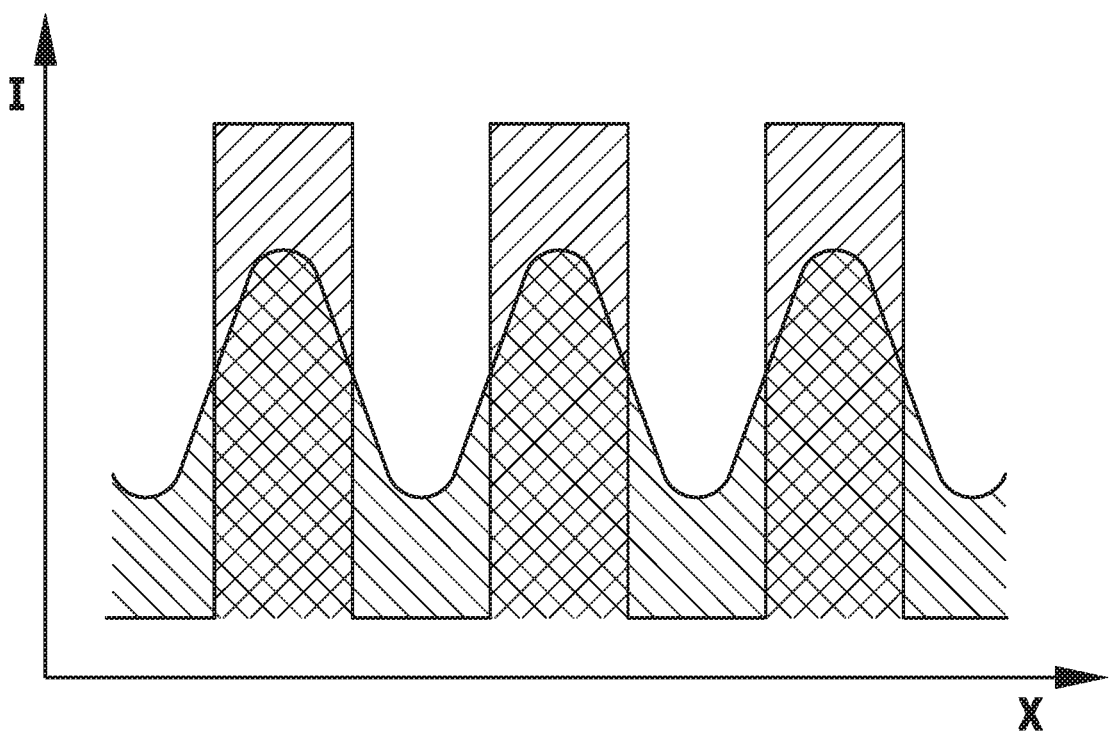
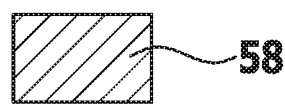 58
 60

METHOD AND DEVICE FOR PRODUCING A THREE-DIMENSIONAL OBJECT AND EXPOSURE MASK GENERATING APPARATUS

CROSS-REFERENCE TO RELATED APPLICATIONS

This application is a continuation of international application number PCT/EP2014/065232 filed on Jul. 16, 2014 and claims the benefit of German application number 10 2013 107 568.1 filed on Jul. 16, 2013, which are incorporated herein by reference in their entirety and for all purposes.

FIELD OF THE INVENTION

The present invention relates to methods for producing three-dimensional objects generally, and more specifically to a method for producing a three-dimensional object by layer by layer solidifying of a material which is solidifiable under the action of radiation, making use of exposure masks, wherein in order to form each object layer to be solidified of the object in a construction plane, there is generated at least one, preferably a single, digital exposure mask by means of which the radiation is selectively projected into the construction plane.

The present invention also relates to exposure mask generating apparatuses for devices for producing three-dimensional objects generally, and more specifically to an exposure mask generating apparatus for a device for producing a three-dimensional object by layer by layer solidifying of a material which is solidifiable under the action of radiation, making use of exposure masks, said device comprising a radiation source for generating the radiation, and the exposure mask generating apparatus which generates at least one, preferably a single, digital exposure mask for forming each object layer to be solidified of the object in a construction plane, by means of which exposure mask the radiation is selectively projected into the construction plane.

The present invention further relates to devices for producing three-dimensional objects generally, and more specifically to a device for producing a three-dimensional object by layer by layer solidifying of a material which is solidifiable under the action of radiation, making use of exposure masks, said device comprising a radiation source for generating the radiation, and an exposure mask generating apparatus.

BACKGROUND OF THE INVENTION

Methods and devices of the aforementioned type are known in many forms, for example, from DE 199 29 199 A1. Three-dimensional objects are therein produced by means of layer by layer curing or melting of preferably plastics materials by means of digital mask exposure wherein the energy input per unit area is controlled by means of the exposure time, according to the locally available light power.

A variety of problems to be solved arise in the production of three-dimensional objects by means of these methods and devices. In particular, it is important, for example, to homogenise a light intensity distribution. As a result of an optical system that is used which comprises, in particular, a radiation source and a projection lens system, typically an inhomogeneous intensity distribution comes about during the imaging. Such an inhomogeneity should however be prevented as far as possible so that the intensity distribution is as homogeneous as possible in a construction-projection plane in which the three-dimensional object is formed.

It is also important to achieve an even hardening depth with differently configured cross-sectional areas of the object layers of the object. Thus, firstly, structures in the object layer with a delicate structure or cross-sectional area are hardened less deeply than structures with a large cross-sectional area. Furthermore, a so-called overexposure can occur in the contour region of the object layer. This can have the consequence, in particular, that for example small hollow spaces in relatively massive structures are not formed at all due to the overexposure of contours thereof since, due to the overexposure, the material in the contour region hardens as far as into the hollow space that is to be formed. And finally, the so-called raw-body hardness is often not sufficient during the production of the three-dimensional object. This is to be understood, in particular, to mean that with particularly delicate (supporting) structures, only inadequate hardening can occur during production of the object, so that these delicate structures often tear off. It can also occur that with very delicate structures, the critical energy for hardening is not achieved and thus the delicate structures are not generated. In the case of massive components, it may be desired to overexpose the inner region during the construction process in order to achieve a greater raw body hardness in the component, since during the burning process, particularly with opaque materials, the radiation has only a small penetration depth.

In order, particularly, to achieve a more even hardening depth with differently configured cross-sectional areas, it is known from the prior art by means of grey value control of the individual pixels of the mask or by means of a multiple exposure using a plurality of masks for a single object layer, to achieve a controlled, pixel-accurate hardening of the object or the object layers forming said object. Reference is made to the aforementioned DE 199 29 199 A1 with regard to grey value control and to EP 1 849 586 A1 with regard to multiple exposure. A disadvantage of grey value control is, in particular, that due to the destruction/reduction of radiation intensity, a longer exposure time is always required per exposure cycle of an object layer in order to achieve the required energy input per object layer. The reason for this is, in particular, that for optimisation, an energy input is always oriented toward the lowest intensity values in the image. In the case of multiple exposure, a plurality of masks must be provided and exposed one after another. This procedure also has the consequence of prolonging the exposure time.

SUMMARY OF THE INVENTION

In a first aspect of the invention, a method is provided for producing a three-dimensional object by layer by layer solidifying of a material which is solidifiable under the action of radiation, making use of exposure masks. In order to form each object layer to be solidified of the object in a construction plane, there is generated at least one, preferably a single, digital exposure mask by means of which the radiation is selectively projected into the construction plane. For each exposure mask, according to the object layer to be solidified, a single 2-bit bitmap is calculated which assigns either the bit-value "transparent" or the bit-value "non-transparent" to each pixel of the exposure mask. The bit-value "transparent" is assigned to at least one surface region of the 2-bit bitmap having a structure size below a limit structure size and an exposure texture is assigned to each surface region above the limit structure size. Said exposure texture is configured in the form of a pattern of pixels with the bit-values "transparent" and "non-transparent".

In a second aspect of the invention, an exposure mask generating apparatus is provided for a device for producing a three-dimensional object by layer by layer solidifying of a material which is solidifiable under the action of radiation, making use of exposure masks, said device comprising a radiation source for generating the radiation and the exposure mask generating apparatus. The exposure mask generating apparatus, for forming each object layer to be solidified of the object in a construction plane, generates at least one, preferably a single, digital exposure mask by means of which the radiation is selectively projected into the construction plane. The exposure mask generating apparatus comprises a computer unit for calculating a single 2-bit bitmap for each exposure mask according to the object layer to be solidified, said 2-bit bitmap assigning to each pixel of the exposure mask either the bit-value "transparent" or the bit-value "non-transparent", for assigning the bit-value "transparent" to each surface region of the 2-bit bitmap with a structure size below a limit structure size and for assigning an exposure texture to each surface region above the limit structure size, said exposure texture being configured in the form of a pattern of pixels with the bit-values "transparent" and "non-transparent".

In a third aspect of the invention, a device is provided for producing a three-dimensional object by layer by layer solidifying of a material which is solidifiable under the action of radiation, making use of exposure masks, comprising a radiation source for generating the radiation, and an exposure mask generating apparatus. The exposure mask generating apparatus, for forming each object layer to be solidified of the object in a construction plane, generates at least one, preferably a single, digital exposure mask by means of which the radiation is selectively projected into the construction plane. The exposure mask generating apparatus comprises a computer unit for calculating a single 2-bit bitmap for each exposure mask according to the object layer to be solidified, said 2-bit bitmap assigning to each pixel of the exposure mask either the bit-value "transparent" or the bit-value "non-transparent", for assigning the bit-value "transparent" to each surface region of the 2-bit bitmap with a structure size below a limit structure size and for assigning an exposure texture to each surface region above the limit structure size, said exposure texture being configured in the form of a pattern of pixels with the bit-values "transparent" and "non-transparent".

BRIEF DESCRIPTION OF THE DRAWINGS

The foregoing summary and the following description may be better understood in conjunction with the drawing figures, of which:

FIG. 6 shows a schematic representation of the intensity distribution of the radiation after generation and during incidence on the construction plane in the surface region of an exposure texture, in this case a chess board pattern on the pixel level;

DETAILED DESCRIPTION OF THE INVENTION

Figure 1:
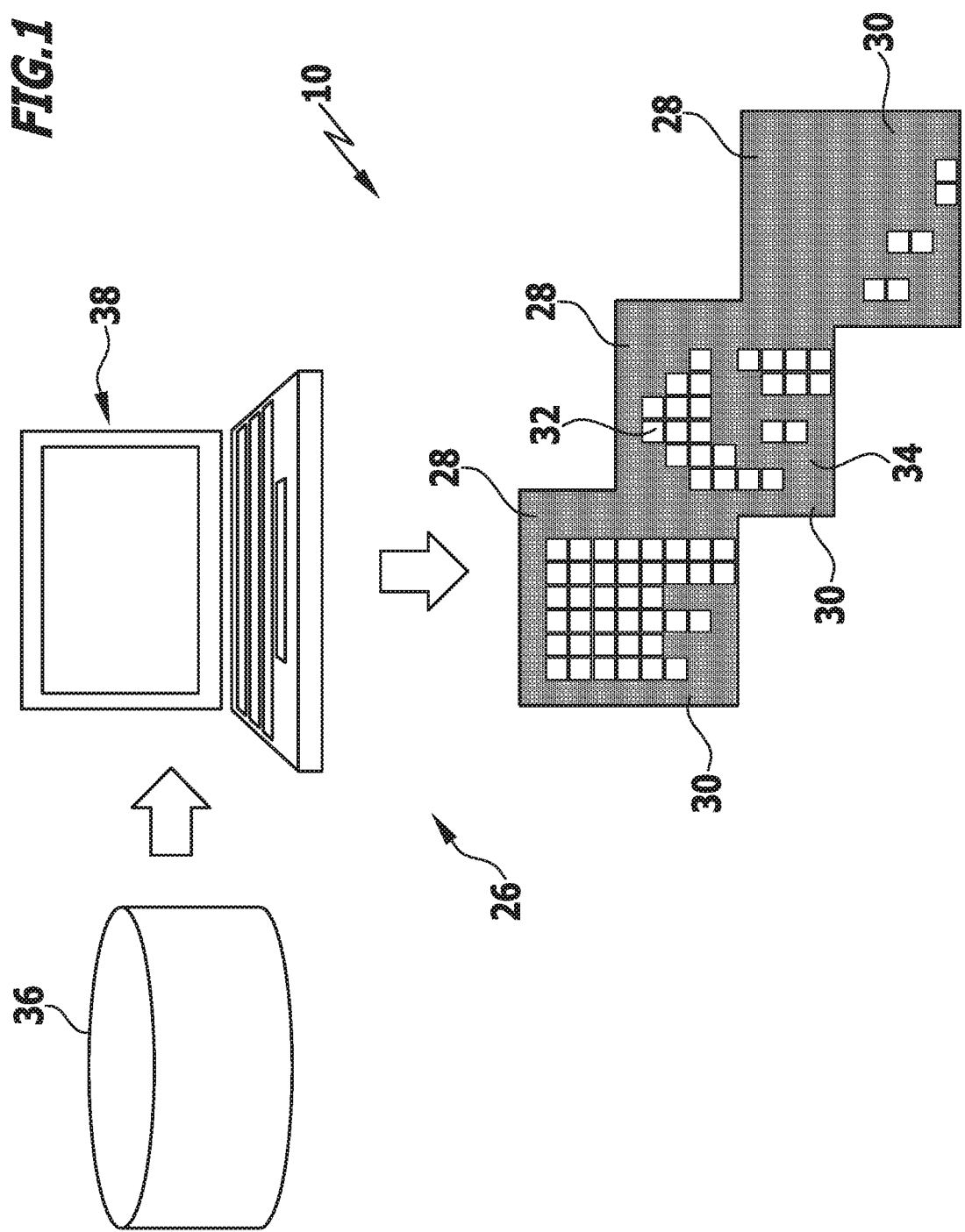
FIG. 1 shows a schematic representation of a part of a device for producing a three-dimensional object.

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a method for producing a three-dimensional object by layer by layer solidifying of a material which is solidifiable under the action of radiation, making use of exposure masks, wherein in order to form each object layer to be solidified of the object in a construction plane, there is generated at least one, preferably a single, digital exposure mask by means of which the radiation is selectively projected into the construction plane, wherein for each exposure mask, according to the object layer to be solidified, a single 2-bit bitmap is calculated which assigns either the bit-value "transparent" or the bit-value "non-transparent" to each pixel of the exposure mask, wherein the bit-value "transparent" is assigned to at least one surface region of the 2-bit bitmap having a structure size below a limit structure size and wherein an exposure texture is assigned to each surface region above the limit structure size, said exposure texture being configured in the form of a pattern of pixels with the bit-values "transparent" and "non-transparent".

The method proposed according to the invention enables, in particular, an object layer that is to be produced to be exposed with only one single exposure mask. In addition, a grey value control is fundamentally superfluous, although it is optionally still possible. For example, it is possible to provide merely a black/white bitmap as the 2-bit bitmap. It is naturally also conceivable to select the bit-values "transparent" with different brightness for each exposure mask. Preferably, each bitmap should have only two different intensity values for the transparency of the exposure mask, identified for example, with "transparent" and "non-transparent". In particular, both bit-values can also permit a certain transparency for the radiation, so that the transparency of the bit-value "transparent" is always greater than the transparency of the bit-value "non-transparent". In addition, the method can also be used for reflective systems wherein then the bit-values "transparent" and "non-transparent" are to be understood in a similar way, that is, for example, the exposure mask reflects the radiation or deflects it in a desired manner to the construction plane when the bit-value is "transparent" and does not reflect the radiation, absorbs it or deflects it beside the construction plane if the bit-value is "non-transparent". Preferably, exposure textures are used which have regular patterns of pixels with both the available bit-values of the 2-bit bitmap. For example, chess board-like patterns or patterns containing zig-zag lines or stripes can be provided. In particular, it is possible with the at least one exposure mask to control the energy input selectively at the pixel level through the radiation into the solidifiable material in the construction plane. It is also possible to assign to each surface region of the 2-bit bitmap with a structure size below a limit structure size, the bit-value "transparent" and to assign to each surface region above the limit structure size an exposure texture, said exposure texture being configured in the form of a pattern of pixels with the bit-values "transparent" and "non-transparent".

It is favourable if the exposure texture has at most as many pixels with the bit-value "non-transparent" as pixels with the bit-value "transparent". In this way, it can be ensured that essentially a planar structure is creatable. In particular, in the extreme case described, that is, if as many pixels are provided with the bit-value "transparent" as with the bit-value "non-transparent", a chess board-like structure can be formed in which the different pixels are alternately arranged.

Advantageously, each exposure texture has an exposure attenuation value which is greater than 0 and not more than 0.5. In this way, an intensity of the radiation can be attenuated in a desired manner in desired regions of the object layer by means of the exposure mask with an exposure attenuation value in the specified region.

It is favourable if an exposure texture is assigned to at least one surface region with a structure size above the limit structure size, depending on the structure size of said surface region and if, with increasing structure size, the exposure attenuation value of the exposure texture increases. In this way, it can be achieved, for example, that particularly relatively large structures can be irradiated with an intensity of the radiation which is lower on average than relatively delicate structures. By means of the transfer function of the optical system, also known as the "modulation transfer function" (MTF)—denoted here as "unsharpness"—and the overexposure effect in the construction plane, a mean value of light intensity is coupled over the structure surface into the material in the construction plane. In particular, the dependency function of the exposure texture can form a linear function or a step function from the structure size. A step function can define, in particular, a dependency to the effect that a finite number of discrete surface textures is provided, each of which is assigned to a discrete exposure attenuation value. For example, five, ten, 15 and 20 steps, that is, n steps can be provided in order to assign to each of a corresponding number of exposure textures a corresponding exposure attenuation value in the range from 0 to 0.5. In particular, it is favourable if an exposure texture is assigned to each surface region with a structure size above the limit structure size, depending on the structure size of said surface region.

In order to increase the stability of the object, it is advantageous if identical exposure textures of exposure masks for exposing successive object layers are arranged in a plane parallel to the construction plane offset relative to one another by a whole number of pixels. Preferably, the identical exposure textures are offset by 1 pixel in an x-direction or a y-direction of the plane parallel to the construction plane. Through this variant of the method, it can be ensured particularly that 2 pixels having the bit-value "non-transparent" do not lie over one another in successive object layers.

It is favourable if different texture patterns for configuring the exposure textures are provided, said texture patterns having a ratio of pixels with the bit-value "non-transparent" and of pixels with the bit-value "transparent" lying in the range between 0 and 1. Through the provision of the texture pattern, the surface regions of the object layer which are then defined can be filled directly with the respective texture pattern.

Preferably, each exposure texture is configured in the form of a hatching or a regular pattern. In this way, it can also be ensured particularly that 2 pixels having the bit-value "non-transparent" do not lie adjacent to one another in the texture.

It is also advantageous if only exposure textures are used for which, at most, corners of pixels with the bit-value "non-transparent" meet one another, but no longitudinal edges of pixels with the bit-value "non-transparent" adjoin one another. In this way, it can be prevented that 2 pixels with the bit-value "non-transparent" directly adjoin one another so that no relatively large regions with non-solidified material are generated in the object by the exposure texture.

In a particularly simple manner, regular exposure textures can be generated if they are convertible into themselves by a translation in a plane parallel to the construction plane. In other words, they can, in particular, consist of a simple basic pattern comprising few pixels which can be regularly arranged by suitable translation in order to form the exposure texture.

It is favourable if the translation is defined by a vector which has a length which corresponds to n pixels in an x-direction and m pixels in a y-direction not parallel to the x-direction, wherein n and m are whole numbers. Thus, an exposure texture can easily be generated with a mask exposure apparatus. In particular, the x-direction and the y-direction can be oriented perpendicular to one another.

It is advantageous if the exposure texture is rasterised pixel by pixel. This is to be understood, in particular, such that the smallest unit of the exposure texture is a pixel.

In order to achieve, in particular, a solid, smooth, closed surface of the object, it is advantageous if a closed edge line is assigned in each exposure mask for each outer and inner contour of the exposure area to each exposure area which defines a cross-sectional area of the object and if the bit-value "transparent" is assigned to the pixels forming the edge line.

In order that the stability of the edge line can be configured in an optimum relation to a width, it is favourable if a width of the edge line is at least 2 pixels. In particular, it is advantageous if the width of the edge line lies in a range from 2 to 8 pixels. Preferably, the width of the edge line lies in a range from 2 to 4 pixels.

Material can be solidified in a simple manner if electromagnetic radiation or particulate radiation is used as the radiation. Favourably, in particular, electromagnetic radiation in the ultraviolet spectral region is used.

In order to be able to realise the structure of the object as quickly as possible, it is advantageous if an individual exposure time is assigned to each exposure mask. Thus the exposure time can be pre-set in an optimised way, depending on the shape and thickness of the object layer to be solidified and the lateral position of the surface to be exposed within the construction plane, so that the exposure has to be made only until the object layer has the required stability or hardening depth.

The method is particularly easily realisable if the exposure time is identical for all the exposure masks. In this way, an individual time control can be dispensed with.

According to a further preferred variant of the method according to the invention, it can be provided that in each exposure mask, a self-contained closed outer contour line for delimiting the exposure area is assigned to each exposure area which defines a cross-sectional area of the object, that the bit-value "transparent" is assigned to the pixels for forming the contour line, that a separating line bordering internally on the contour line is assigned to each exposure mask and that the bit-value "non-transparent" is assigned to the pixels for forming the separating line. It can also be advantageous, if the object layer to be formed which is defined by the exposure area has at least one recess, if a self-contained closed inner contour line for delimiting the object layer is defined round the at least one recess, if the bit-value "transparent" is assigned to the pixels for forming this contour line, if a separating line directly bordering externally on this contour line is defined and if the bit-value "non-transparent" is assigned to the pixels for forming the separating line. In both cases, effectively an intensity swathe is formed, specifically in each case directly bordering the contour line for the exposure area, that is toward the region to be exposed of the object layer. This intensity swathe causes, in particular, as little scattered light as possible to be split over the outer and inner contours, through which light, for one thing, the surface quality and, for another thing, the dimensional conformity of the object to be produced can be impaired. Furthermore, it can be favourable if the respective separating line borders directly on the inner and outer contour line. In particular, it is advantageous if more than one separating line is provided. In particular, two, three or more separating lines, which separate the relevant number of contour lines from one another, can be provided. In particular, one of the separating lines can also border on an edge line, as defined above. In other words, two or three separating lines which can be separated by a contour line from one another can extend parallel to one another. Optionally, it is also conceivable that one or more separating lines are interrupted, for example, by transversely extending connecting lines which connect the contour line to a further contour line or to an edge line of a surface region of the object layer to be exposed. These connecting lines which extend, for example, transversely, particularly perpendicularly to the separating line have the advantage that in this way, the stability of the three-dimensional object can be improved overall, specifically without significantly impairing the advantage that the formation of the separating line brings with it.

It is favourable if a width of the contour line and/or of the separating line is at least 2 pixels. Preferably, the width in one region lies in a range from 2 to 8 pixels. Preferably, the width of the contour line and/or of the separating line lies in a range from 2 to 4 pixels. The minimum width given is suitable in particular, to ensure, on the one hand, the advantages of the formation of a contour line or a separating line and, on the other hand, a stability of the three-dimensional object.

Advantageously, a separating line for those surface regions the structure size of which has a width and/or a length which is at least double a width of the contour line is assigned to each exposure mask. In this way, it can be ensured, in particular, that the stability especially of small delicate structures is not impaired by the formation of a separating line.

Preferably, the construction plane is exposed in oscillating manner during an exposure time. This should be understood in particular to mean that an oscillating relative movement is generated between the image in the construction plane and the object to be produced. The advantage of such an oscillating exposure is particularly that a smoothing of the surface of the object to be produced is achievable by easy means, since corners and steps in the edge region of the exposed object layer are thereby effectively blurred, as distinct from the antialiasing function by means of grey steps in the contour region. Therefore also, no multiple exposure, as described in DE 10 2004 022 961 B4 for example, is necessary, but rather this edge smoothing can be achieved with a single mask exposure.

It is advantageous if an oscillation displacement of the exposure lies in an x-direction and/or a y-direction parallel to the construction plane in a region which corresponds to not more than the width of a pixel. In other words, it is advantageous if, for edge smoothing, an oscillation is realised in the subpixel range. It is favourable if the oscillation displacement is not more than 0.5 pixel, in particular not more than 0.25 pixel.

It is particularly favourable if an oscillation of the exposure in the x-direction and the y-direction is overlaid during the exposure time to a circular or substantially circular oscillation. Thus, overall a complete circulating movement can be carried out, which leads to edge smoothing in the corresponding subpixel range. All the corners which are defined by the exposure mask can thus be smoothed with the corresponding radius of the circle defined by the oscillation. In particular, it is favourable if the oscillation is performed in such a way that at the end of the exposure time for solidifying a single object layer, whole-number multiples of a circular oscillation have been completed. Thus a particularly even energy input can be achieved in the edge region of the object layer to be formed.

According to a preferred variant of the method according to the invention, it can be provided that a radiation source for generating the radiation and/or the exposure mask and/or an imaging optical system for imaging the radiation onto the construction plane and/or the object to be produced are moved in oscillating manner during the exposure time. Depending on the combination of elements moved relative to one another, an oscillating exposure can thus be achieved.

An oscillating exposure can be realised in a particularly easy way if an imaging optical system with a rotating plane-parallel plate is used in which the plate is rotated about a rotation axis perpendicular or substantially perpendicular to the construction plane, which includes an angle with the rotation axis differing from 90°.

The invention further relates to an exposure mask generating apparatus for a device for producing a three-dimensional object by layer by layer solidifying of a material which is solidifiable under the action of radiation, making use of exposure masks, said device comprising a radiation source for generating the radiation and the exposure mask generating apparatus which exposure mask generating apparatus, for forming each object layer to be solidified of the object in a construction plane, generates at least one, preferably a single, digital exposure mask by means of which the radiation is selectively projected into the construction plane, wherein the exposure mask generating apparatus comprises a computer unit for calculating a single 2-bit bitmap for each exposure mask according to the object layer to be solidified, said 2-bit bitmap assigning to each pixel of the exposure mask either the bit-value "transparent" or the bit-value "non-transparent", for assigning the bit-value "transparent" to each surface region of the 2-bit bitmap with a structure size below a limit structure size and for assigning an exposure texture to each surface region above the limit structure size, said exposure texture being configured in the form of a pattern of pixels with the bit-values "transparent" and "non-transparent".

The further developed exposure mask generating apparatus according to the invention for a device for producing a three-dimensional object through layer by layer solidifying under the action of radiation of a material using exposure masks enables an object layer that is to be solidified of the object to be formed with a single exposure mask, in order to control the energy input into the material in the construction plane according to the surface structure within a layer or an exposure cycle per layer. The proposed invention particularly enables the pixels with the bit-value "transparent" to be exposed with the maximum available radiation intensity which is required to solidify the material to be solidified in the desired manner. This means, in particular, that the radiation intensity for pixels with the bit-value "transparent" can vary according to the object layer, although it is preferably constant or constant to the extent that this is enabled by the radiation source. As mentioned above, the bit-value "non-transparent" does not necessarily mean that absolutely no radiation is allowed through. This is a possible special case. Rather, the bit-values "transparent" and "non-transparent" represent two mutually different transparency values wherein a pixel to which the bit-value "transparent" is assigned allows more radiation through than a pixel to which the bit-value "non-transparent" is assigned. The proposed 2-bit bitmap makes it possible in a surface region with the assigned exposure textures to reduce the mean radiation input.

Preferably, the computer unit is configured to assign an exposure texture which has, in a surface region to be exposed, at most as many pixels with the bit-value "non-transparent" as pixels with the bit-value "transparent". In this way, particularly with a suitable arrangement of the pixels, it can be achieved that 2 or more pixels with the bit-value "non-transparent" do not lie adjacent to one another for configuring the exposure texture, which could reduce a stability of the object to be formed.

It is advantageous if the computer unit is configured to assign an exposure texture which has an exposure attenuation value which is greater than 0 and not more than 0.5. By this means, it is possible for a particular surface region to which the exposure texture is assigned to attenuate accordingly a radiation intensity applied on average. This can also serve, in particular, to even out inhomogeneities in the intensity distribution of the radiation generated by the radiation source in a targeted way for particular surface regions.

It is also favourable if the computer unit is configured to assign an exposure texture to at least one surface region with a structure size above the limit structure size, depending on the structure size of said surface region, wherein with increasing structure size, the exposure attenuation value of the exposure texture increases. The computer unit to be configured in this way has the advantage that a radiation input into the respective area can be optimised in order particularly to prevent overexposures. The larger assigned, particularly coherent, surface regions are, the less light intensity is required in order to achieve a required solidification for forming the respective object layer.

According to a further preferred embodiment of the invention, it can be provided that the computer unit is configured for the arrangement of identical exposure textures of exposure masks for exposing successive object layers in a plane parallel to the construction plane offset relative to one another by a whole number of pixels. Preferably, the exposure textures are offset relative to one another by 1 pixel in an x-direction and/or a y-direction of the plane parallel to the construction plane. By this means, it can be prevented particularly that pixels with the bit-value "non-transparent" lie directly over one another in successive object layers, which could result in a reduction in the stability of the three-dimensional object.

It is favourable if the exposure mask generating apparatus provides different texture patterns for configuring the exposure textures which have a ratio of pixels with the bit-value "non-transparent" and of pixels with the bit-value "transparent" lying in the range between 0 and 1. If corresponding texture patterns are provided, for example, in a storage unit of the computer unit or of the exposure mask generating apparatus, then a texture corresponding to the given pixel ratio does not have to be calculated every time, rather the relevant desired texture pattern can be selected directly and used, for example, for filling a surface region of the object layer to be formed for generating the exposure mask.

In a particularly easy manner, exposure textures can be stored if the exposure mask generating apparatus provides each exposure texture in the form of a hatching or a regular pattern. Hatching or regular patterns of this type can be ascribed to individual basic patterns repeating within the pattern, so that the storage space required therefor is minimised and the filling of surface regions can be time-optimised.

It can also be favourable if the computer unit is configured for the exclusive use of exposure textures for which, at most, corners of pixels with the bit-value "non-transparent" meet one another, but no longitudinal edges of pixels with the bit-value "non-transparent" adjoin one another. It can thus be prevented that an exposure texture has 2 pixels with the bit-value "non-transparent" directly adjoining one another, which could reduce a stability of the three-dimensional object.

The exposure mask generating apparatus can be formed in a particularly easy way if the exposure mask generating apparatus is configured to provide exposure textures which are convertible into themselves by a translation in a plane parallel to the construction plane. As mentioned above, individual texture elements which comprise a minimum pixel count can thus be stored as texture patterns and serve, through suitable translation, for filling previously determined surface regions, by which means an exposure mask is generatable in a simple manner.

Preferably, the translation is defined by a vector which has a length which corresponds to n pixels in an x-direction and m pixels in a y-direction not parallel to the x-direction, wherein n and m are whole numbers. For example, for each basic pattern of a texture, an associated vector can be defined and stored, with which, in conjunction with the basic pattern of the texture, a previously determined surface region of the exposure mask can be filled with the texture pattern.

Favourably, the exposure mask generating apparatus is configured to provide exposure textures which are rasterised pixel by pixel. In this way, particular surface regions of the exposure mask can be filled with particular exposure textures in a simple manner.

According to a further preferred embodiment of the invention, it can be provided that the exposure mask generating apparatus is configured to assign a closed edge line to each exposure area which defines a cross-sectional area of the object, wherein a closed edge line area is assigned to each exposure mask for each outer and inner contour of the exposure and that the bit-value "transparent" is assigned to the pixels forming the edge line. Providing an edge line of this type has the advantage that the surface quality of the component is improved.

In order to generate an edge line with sufficient stability, it is advantageous if a width of the edge line amounts to at least 2 pixels. Preferably, the width of the edge line lies in a range from 2 to 8 pixels, in particular, in a range from 2 to 4 pixels. Thus, particularly also small structures, that is, structures with a minimum dimension in a region of only a few pixels, can be provided with a suitable edge line.

It is advantageous if the exposure mask generating apparatus is configured to assign an individual exposure time to each exposure mask. This makes it possible, for example, for the exposure time to be selected individually for each object layer that is to be created, according to the exposure mask and particularly the type and shape of the surface to be exposed. This makes it possible to expose each object layer with the minimum exposure time required to cure the material, thus minimising the production time for the three-dimensional object overall.

The device can be configured in a particularly easy manner if the exposure mask generating apparatus is configured to assign an identical exposure time for all exposure masks. In this way, an exposure time control system or an individual exposure time control for each exposure mask can be dispensed with, which simplifies the provision of the respective exposure masks.

It is advantageous if the exposure mask generating apparatus is configured for assigning a self-contained closed outer contour line for delimiting an exposure area, which defines a cross-sectional area of the object, and to assign a separating line bordering internally on the contour line to each exposure mask, wherein the bit-value "transparent" is assigned to the pixels for forming the contour line and the bit-value "non-transparent" is assigned to the pixels for forming the separating line. As described above, there can also be a closed inner contour line which borders a recess, that is, a region not to be exposed of the object layer to be solidified, wherein the bordering separating line then surrounds the contour line externally. A plurality of such contour lines can also be provided which are separated from one another by separating lines. The provision of separating lines has the advantage that overexposure of outer and inner contours, which can impair a surface quality of the object layer to be formed and therefore of the object as a whole, can be prevented by easy means. Naturally, each separating line can also be interrupted by suitable connecting lines or "connecting webs" which, for example, connect the contour line to the edge line and so interrupt the separating line. This can be desirable for stability reasons in order to be able to ensure the cohesion of the object as a whole.

So that the separating line can have the desired effect, it is advantageous if a width of the contour line and/or of the separating line is at least 2 pixels. Favourably, the width lies in a range from 2 to 8 pixels. Preferably, the width of said lines lies in a range from 2 to 4 pixels.

According to a further preferred embodiment of the invention, it can be provided that the exposure mask generating apparatus is configured for assigning a separating line to an exposure mask for those surface regions thereof the structure size of which has a width and/or a length which is at least double a width of the contour line. It can thus be ensured that separating lines can only be assigned to surface regions with sufficiently large structure sizes. Thus adequate hardening, particularly of delicate structures, can be ensured.

The invention further relates to a device for producing a three-dimensional object by layer by layer solidifying of a material which is solidifiable under the action of radiation, making use of exposure masks, comprising a radiation source for generating the radiation, and an exposure mask generating apparatus, which exposure mask generating apparatus, for forming each object layer to be solidified of the object in a construction plane, generates at least one, preferably a single, digital exposure mask by means of which the radiation is selectively projected into the construction plane, wherein the exposure mask generating apparatus comprises a computer unit for calculating a single 2-bit bitmap for each exposure mask according to the object layer to be solidified, said 2-bit bitmap assigning to each pixel of the exposure mask either the bit-value "transparent" or the bit-value "non-transparent", for assigning the bit-value "transparent" to each surface region of the 2-bit bitmap with a structure size below a limit structure size and for assigning an exposure texture to each surface region above the limit structure size, said exposure texture being configured in the form of a pattern of pixels with the bit-values "transparent" and "non-transparent".

Thus, the advantages described in relation to preferred embodiments of exposure mask generating apparatuses also apply to the device for producing a three-dimensional object. In particular, devices thus already available on the market for manufacturing a three-dimensional object can be retrofitted with an exposure mask generating apparatus according to the invention.

It is advantageous if the device comprises an oscillation device for exposing in oscillating manner the construction plane during an exposure time. Exposing in oscillating manner means, in particular, that an oscillation movement of the image formed on the construction plane relative to the object is realised by means of the oscillation device. It is thus possible, with such an oscillation device to smooth angular structures along a contour of the object layer, specifically in that an outer contour is effectively blurred during the exposure of the object layer by means of the oscillation. Preferably, the oscillation apparatus enables a natural number of oscillations to be realised during the exposure time provided for the respective object layer in order to achieve the most even possible edge smoothing along the contour of the object layer.

It is favourable if the oscillation apparatus has an oscillation displacement of the exposure which lies in an x-direction and/or a y-direction parallel to the construction plane in a region which corresponds to not more than the width of a pixel. Preferably the oscillation displacement is a maximum of 0.5 pixel. It is favourable if it is not more than 0.25 pixel. In any event, it is possible with such an oscillation displacement in the subpixel range to smooth an outer or inner contour of the object layer to be solidified.

In order to round edges of the contour of the object layer to be solidified, it is favourable if the oscillation apparatus is configured to overlay an oscillation of the exposure in the x-direction and the y-direction during the exposure time to a circular or substantially circular oscillation. In particular, exactly one circular or substantially circular oscillation can be realised during the exposure time with the oscillation device, in order thus to achieve the most even possible edge smoothing.

In order to achieve the above described relative movement for the oscillating exposure, it is advantageous if the oscillation device is coupled to the radiation source and/or the exposure mask generating apparatus and/or the imaging optical system for imaging the radiation on the construction plane and/or a carrier for the object to be produced for oscillating movement of the same during the exposure time. For example, the exposure mask generating apparatus can thus be moved relative to a carrier for the object to be produced in order to achieve the described edge and corner smoothing.

In a particularly easy manner, an oscillation device can be realised if the imaging optical system comprises a rotating plane-parallel plate, which is mounted rotatable about a rotation axis perpendicular or substantially perpendicular to the construction plane and defines a plate plane, which includes an angle with the rotation axis differing from 90°. In this way, it is possible to transmit the radiation, before incidence thereof onto the construction plane, through the plane-parallel plate which is, for example, tilted relative to the construction plane and which, due to the rotation thereof, particularly about the optical axis of the imaging optical system, leads to a rotation of the projected radiation and thus of the projected image of the object layer to be solidified on the construction plane.

Favourably, the radiation source is configured for generating radiation in the form of electromagnetic radiation or particulate radiation. This makes it possible, according to the material to be solidified, for example, a plastics resin or a prepolymer, to use the radiation source ideally suited therefor. In particular, depending on a required energy input for solidifying the material, a suitable radiation source with sufficient radiation intensity can be selected.

The object mentioned in the introduction is further achieved through the use of a device for producing a three-dimensional object by layer by layer solidifying of a material which is solidifiable under the action of radiation using exposure masks, as described above, for carrying out a method for producing a three-dimensional object by layer by layer solidifying of a material that is solidifiable under the action of radiation using exposure masks, as also described above.

Figure 2:
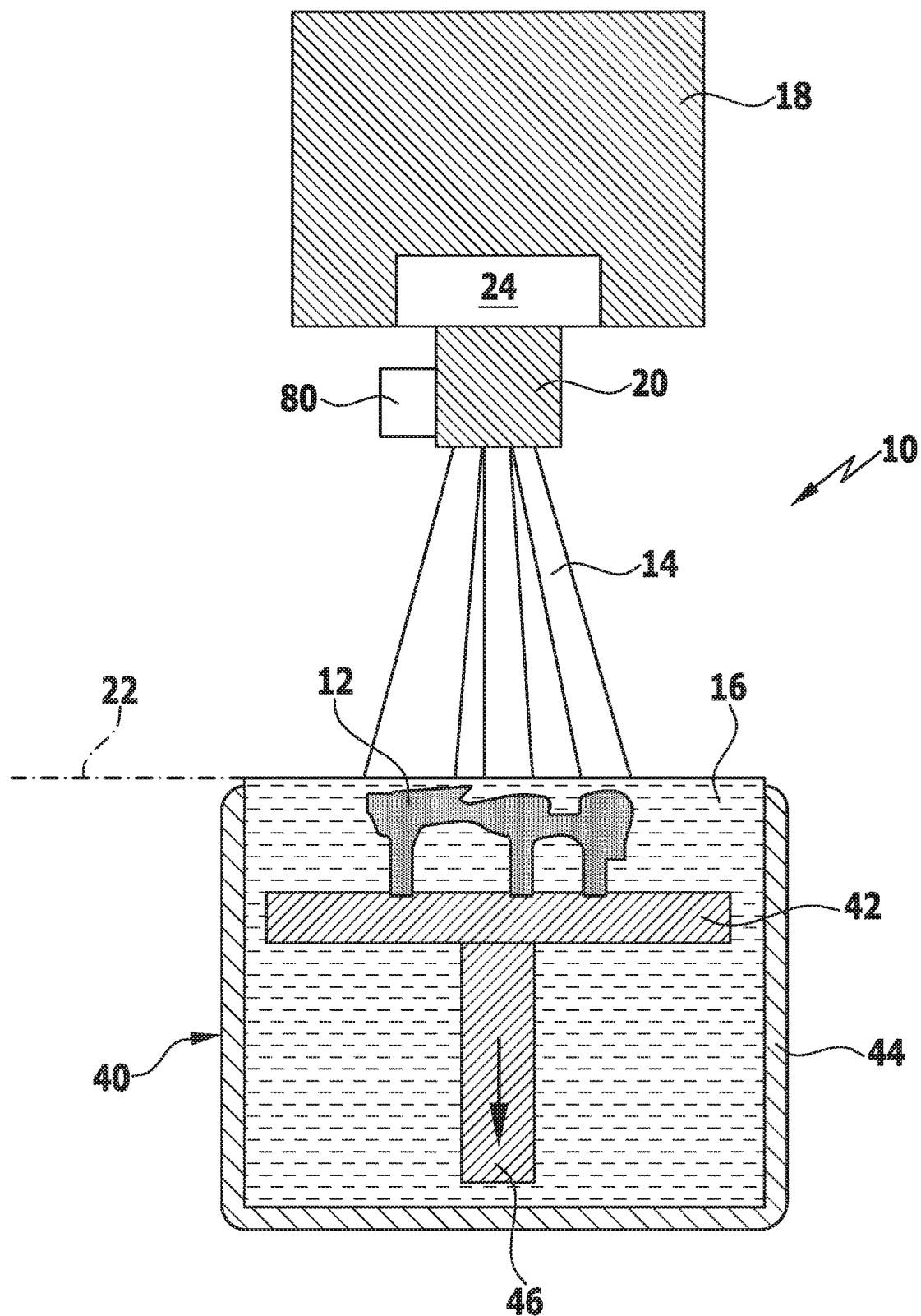
FIG. 2 shows a schematic view of a further part of a device for producing a three-dimensional object.
Figure 3:
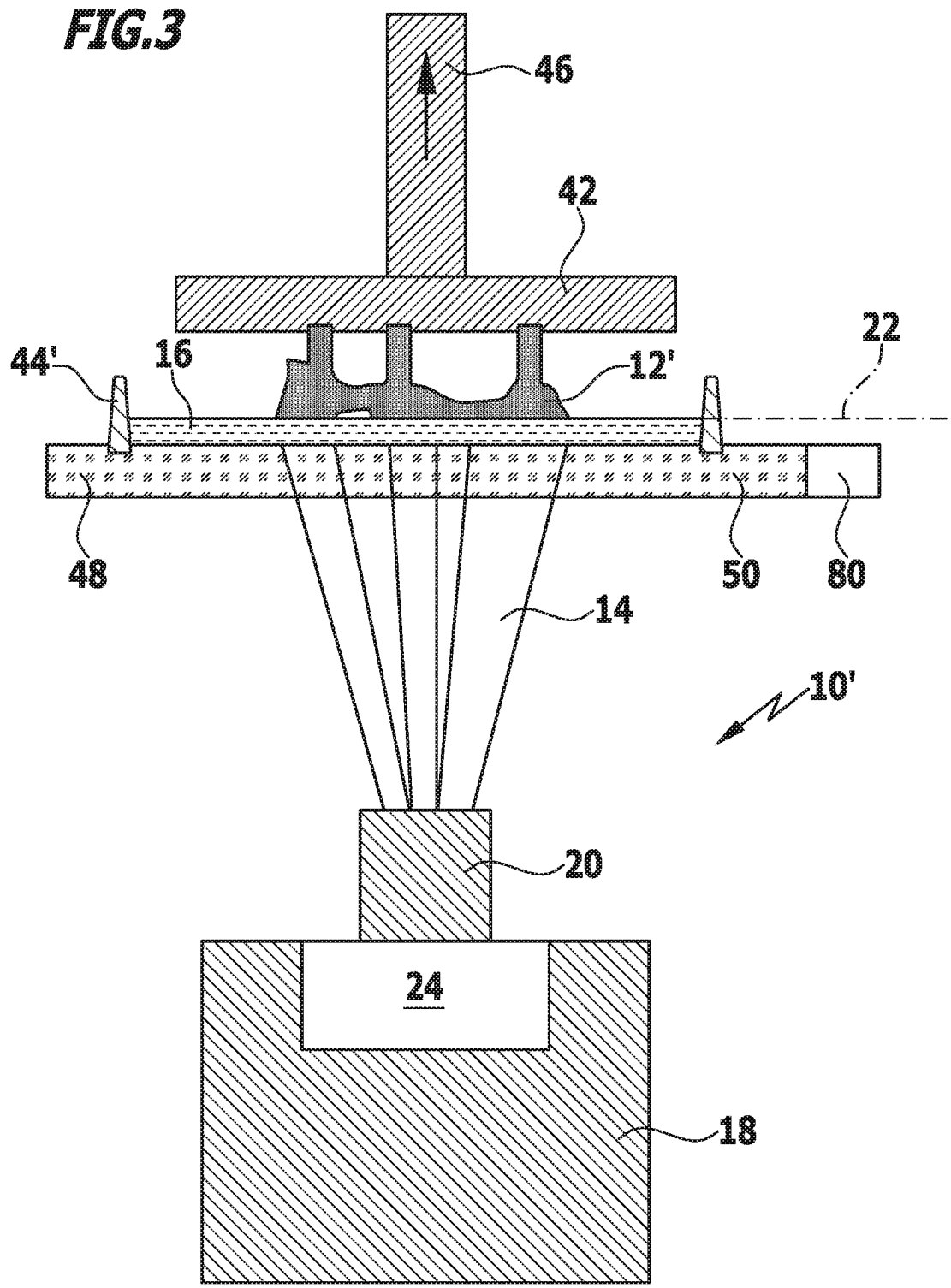
FIG. 3 shows a schematic view of a further part of a second exemplary embodiment of a device for producing a three-dimensional object.

The schematic structure of a device 10 for producing a three-dimensional object by layer by layer solidifying of a material 16 which is solidifiable under the action of radiation 14 is shown schematically in FIGS. 1 to 3 for two different constructional variants.

The device 10 comprises a radiation source 18 which comprises an imaging optical system 20 for imaging an object layer image in an image plane/construction plane 22. Included in the imaging optical system 20 is a mask unit 24 which is controllable by means of an exposure mask generating apparatus 26. With the exposure mask generating apparatus 26, an exposure mask 28 can be generated for each object layer of the object 12, specifically in the form of a 2-bit bitmap 30. Each 2-bit bitmap 30 thus has only two bit-values 32 and 34, wherein the bit-value 32 enables a greater transparency for the radiation 14 than the bit-value 34. In an extreme case, the bit-value 32 for the radiation 14 can be entirely "transparent", the bit-value 34 for the radiation 14 can be entirely "non-transparent". In each case the transparency of the pixels of the 2-bit bitmap 30 with the bit-value 32 is greater than the transparency of the pixels with the bit-value 34.

The exposure mask generating apparatus 26 also comprises a storage device 36 which can contain, for example, stored native information for the object layers to be formed of the object 12 to be formed. These can be transferred, in particular, to a computer 38 or another computer device suitable therefor. According to the layer information, a 2-bit bitmap 30 is calculated with the computer 38 which is then transferred to the mask unit 24 in order to control, for example, an LCD display for exposure in transmission or a digital micromirror device, in order thus to image the radiation 14 generated by the radiation source 18 according to the object layer to be formed, onto the image plane/construction plane 22. In the image plane/construction plane 22, the radiation 14 is incident on still unsolidified viscous material 16 which is solidified after a particular time by the energy input through exposure. For each object layer, an individual exposure time can be specified so that, for example, the mask unit 24 completely prevents the radiation 14 if no object layer is to be formed and lets the radiation 14 through selectively if an object layer is to be formed.

For forming objects 12, in particular two types of carrier system 40 are used. In a variant shown schematically in FIG. 2, a carrier plate 42 is situated in a container 44 filled with the material 16. The carrier plate 42 is movable with a drive device 46 into the container 44, preferably in pre-determined discrete steps which are always completed when a further object layer is solidified by curing of the material on the surface of the already partially formed object 12 and so forms a further object layer.

Alternatively, as shown in FIG. 3, the radiation 14 can also be imaged by a radiation-transparent plate 48 which forms a base 50 of the alternative container 44' into the image plane/construction plane 22. The object layer to be formed also arises by means of energy input into the image plane/construction plane 22, specifically under the last formed object layer. Once an object layer has been cured, by means of the drive unit 46, the already formed object 12 is moved in a pre-determined manner a unit, particularly a distance which corresponds to a thickness of the newly formed object layer, away from the container 44, that is, it is practically pulled out of said container. Now, in a next step, the next object layer can be produced in the image plane/construction plane 22 by exposure of the material 16.

Figure 4:
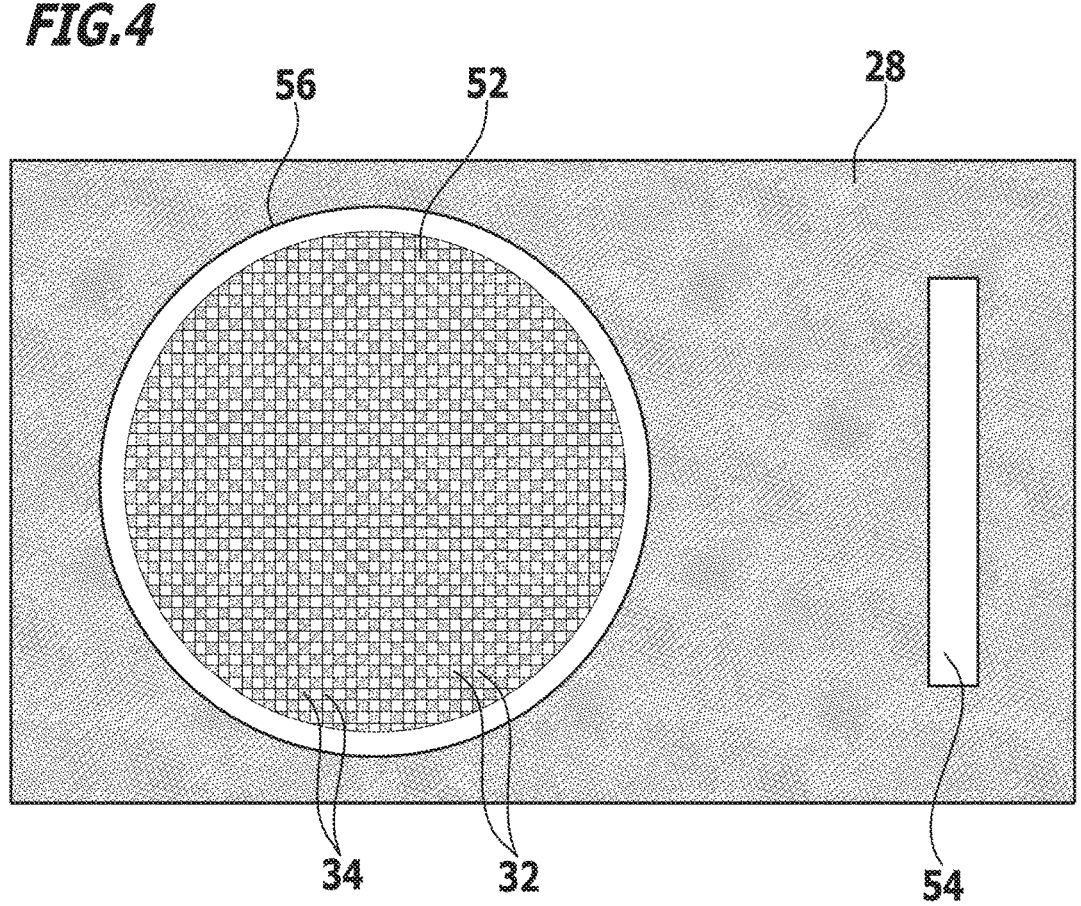
FIG. 4 shows a schematic representation of an exposure mask with an exposure texture.

The exposure mask generating apparatus 26 also makes it possible not only to generate simple 2-bit bitmaps for controlling the mask unit 24 in which the pixels to be solidified in the object layer to be formed are assigned the bit-value 32 and all other pixels are assigned the bit-value 34. Rather, it is optionally also possible with the exposure mask generating apparatus 26 to prevent the problem mentioned in the introduction of the overexposure of large-area regions. In order therefore to be able to produce delicate and large-volume structures adjoining one another during the formation of an object layer with the same good quality, according to the invention it is proposed to fill surface regions of the object 12 having a size above a limit structure size with an exposure texture 52. This process is schematically represented in FIG. 4. A delicate structure 54 is shown schematically in the 2-bit bitmap 30 in FIG. 4 in the form of an elongate narrow rectangle at the right.

In the 2-bit bitmap 30 at the left, a circular area is shown which is large relative to the elongate narrow rectangle, and is delimited externally by a self-contained closed contour line 56. However, the circular area is not entirely filled with pixels having the bit-value 32 "transparent", but with an exposure texture 52. This is made up of individual pixels with the only two available bit-values 32 "transparent" and 34 "non-transparent". The exposure texture 52 is preferably realised in the form of a regular pattern which is rasterised at the pixel level. The rasterising is particularly configured so that only exposure textures are used for which, at most, corners of pixels with the bit-value 34 "non-transparent" meet one another, but no longitudinal edges of pixels with the bit-value 34 "non-transparent" adjoin one another. The exposure texture 52 shown, by way of example, in FIG. 4 exactly matches this specification. It shows a chess board-like pattern wherein pixels with the bit-values 32 "transparent" and 34 "non-transparent" are arranged alternatingly. In order to ensure the stability of the object 12, the contour line 56 is provided with a width which preferably lies in a range from 2 to 8 pixels. It can, in particular, be just 2 to 4 pixels wide.

Figure 5:
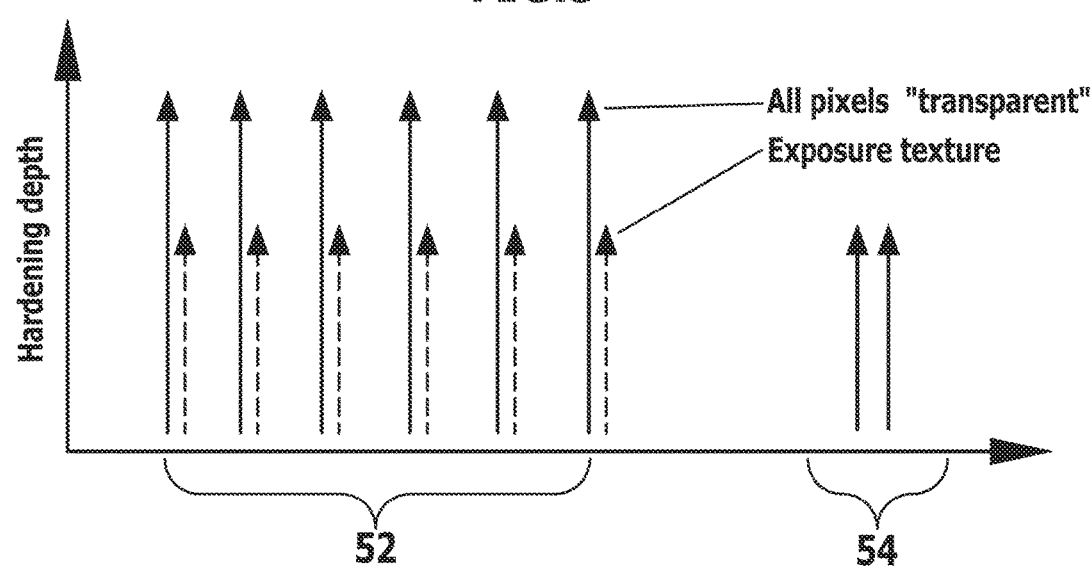
FIG. 5 shows a schematic representation of the hardening depth with and without exposure texture.

An effect that a use of the exposure mask 28 shown in FIG. 4 has is shown schematically in FIG. 5. In a pre-determined fixed exposure time, for the delicate structure 54, the hardening depth shown schematically on the right side in FIG. 5 with arrows is achieved. If the circular area were entirely exposed, a significantly greater hardening depth over the large surface region would result. This is symbolised in the diagram in FIG. 5 with the continuous arrows. The exposure texture 52 which, due to the lower energy input, reduces the hardening depth on average for the relatively large structure, serves herein to achieve a counterbalance. It is thus possible through a suitable selection of exposure textures 52 simultaneously to expose delicate structures 54 and relatively large-area structures with a single exposure mask in a single exposure process, particularly for a minimal exposure time t.

An overall imaging system comprising particularly the imaging optical system 20, the material 16 and possibly the radiation-transparent plate 48 defines a transfer function for the intensity according to the location x. Illustrated schematically in FIG. 6 with the hatching 58 is the intensity distribution, for example, directly after a micromirror unit or an LCD transmitted-light mask. Due to the transfer function of the overall system, an intensity reduction is produced together with a blurred intensity distribution in the construction plane which is signified by the hatching 60. In other words, this means that, due to optical errors, a pixel-line pair can only be imaged by the overall system with a modulation transfer function smaller than 50%.

The contour line 56 surrounding the large surface region, as described above, has the advantage, in particular, that overall, the object 12 can have a smooth, sharp surface.

Figure 7:
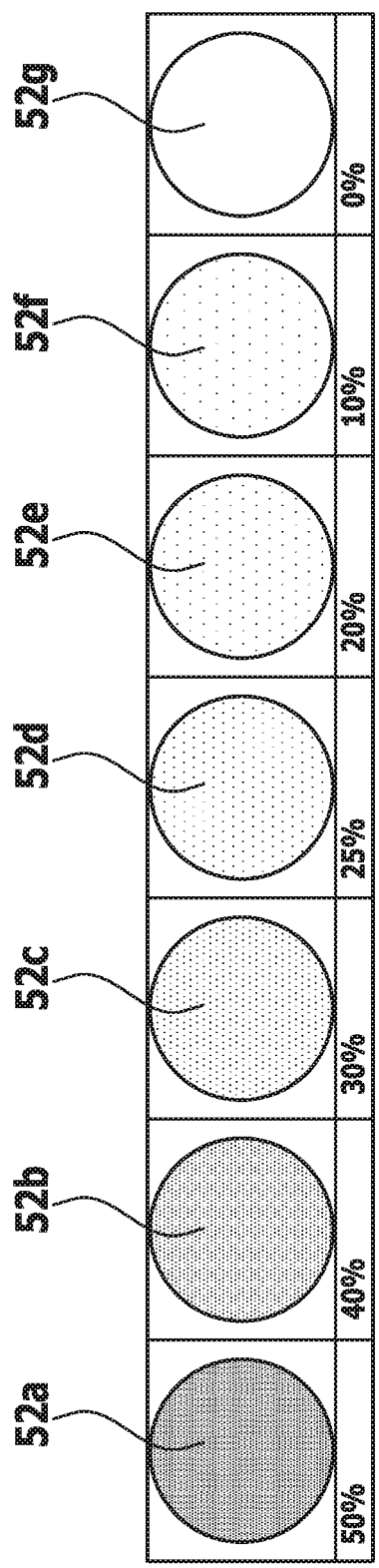
FIG. 7 shows a schematic representation of different texture patterns with the associated exposure attenuation value in percent.

The exposure textures 52 used can be configured, in particular, so that overall, different so-called "filling levels" are produced. It should be understood from this, in particular, that the respective "filling level" corresponds to an exposure attenuation value which is a measure for how much of the total energy input into an area is attenuated. The area patterns 52a to 52g shown schematically in FIG. 7 represent corresponding exposure attenuation values which are given for each exposure texture 52a to 52b, by way of example, as percentages. The respective percentage value thus gives the proportion of the pixels with the bit-value 34 "non-transparent" in the respective exposure texture 52a to 52g.

It is advantageous if the pixels with the bit-value 34 "non-transparent" are evenly distributed in the respective exposure texture 52a to 52g. Preferably, the pixels with the bit-value 34 "non-transparent" are each arranged separately, which means that along their longitudinal edges, they always adjoin pixels to which the bit-value 32 "transparent" is assigned. Such a configuration of exposure textures 52a to 52g has the advantage, in particular, that an intensity distribution of the radiation 14 in the image plane/construction plane 22 is homogenised and averaged by the described optical transfer function of the overall system. In other words, large surface regions, although they are filled with an exposure texture 52, are also exposed in the desired manner and achieve the required hardening depth which is also achieved for delicate structures 54.

Figure 8:
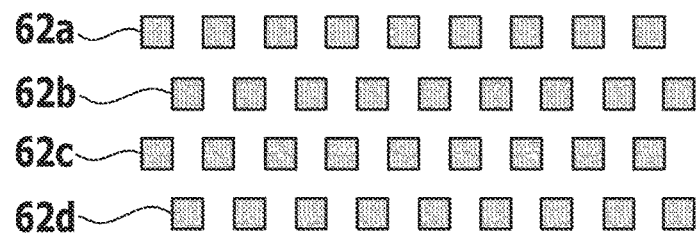
FIG. 8 shows a schematic sectional representation of identical texture patterns of exposure masks for exposure of successive object layers.

In order to increase the stability of the object 12 overall, exposure textures 52 of exposure masks 28 for exposing successive object layers are preferably arranged in a plane parallel to the image plane/construction plane 22 offset relative to one another by a whole number of pixels, specifically preferably by 1 pixel. This is shown schematically in FIG. 8 for the object layers 62a to 62d, wherein each of the object layers 62a to 62d corresponds to an exposure area which is defined by an exposure mask 28.

Figure 9:
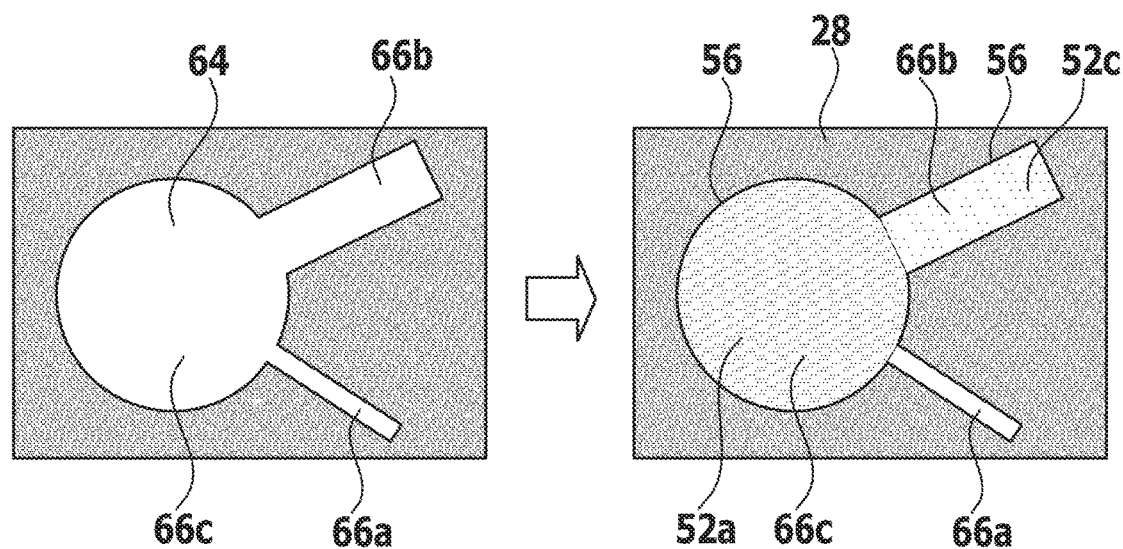
FIG. 9 shows a schematic representation of the selection of an exposure mask with different texture patterns depending on different identified (limit) structure sizes within a surface to be exposed in the object layer to be formed.

Complex cross-sectional areas of objects 12 as shown schematically in FIG. 9 at the left can be subdivided into different-sized surface regions 66a, 66b and 66c. In the schematic example shown in FIG. 9, the surface regions 66b and 66c are larger than, for example, a pre-determined limit structure size. The surface region 66a is correspondingly smaller than the pre-determined limit structure size. Therefore, the surface region 66a which forms a delicate structure is not filled with an exposure texture, but rather a bit map 30, as shown, for example, in FIG. 9 at the right, is selected in which the surface region 66a is entirely filled with pixels having the bit-value 32 "transparent".

The surface regions 66b and 66c are preferably surrounded by an outer edge line 56 which ideally has a width of at least 2 pixels. In order to achieve the most homogeneous possible intensity distribution and the most homogeneous possible hardening depth for all surface regions of the object layer to be formed, for example, the surface region 66b is filled with the exposure texture 52e and the surface region 66c is filled with the exposure texture 52c. Thus, the energy input of the surface region 66b is reduced by 20% on average and the energy input of the surface region 66c is reduced by 50% on average.

Naturally, in a similar way, for more complex cross-sectional areas of the object 12, the subdivision into surface regions can also be further refined and, according to the size thereof, the appropriate exposure texture 52 can be selected in order to achieve the most homogeneous possible distribution for the hardening depth.

Figure 10:
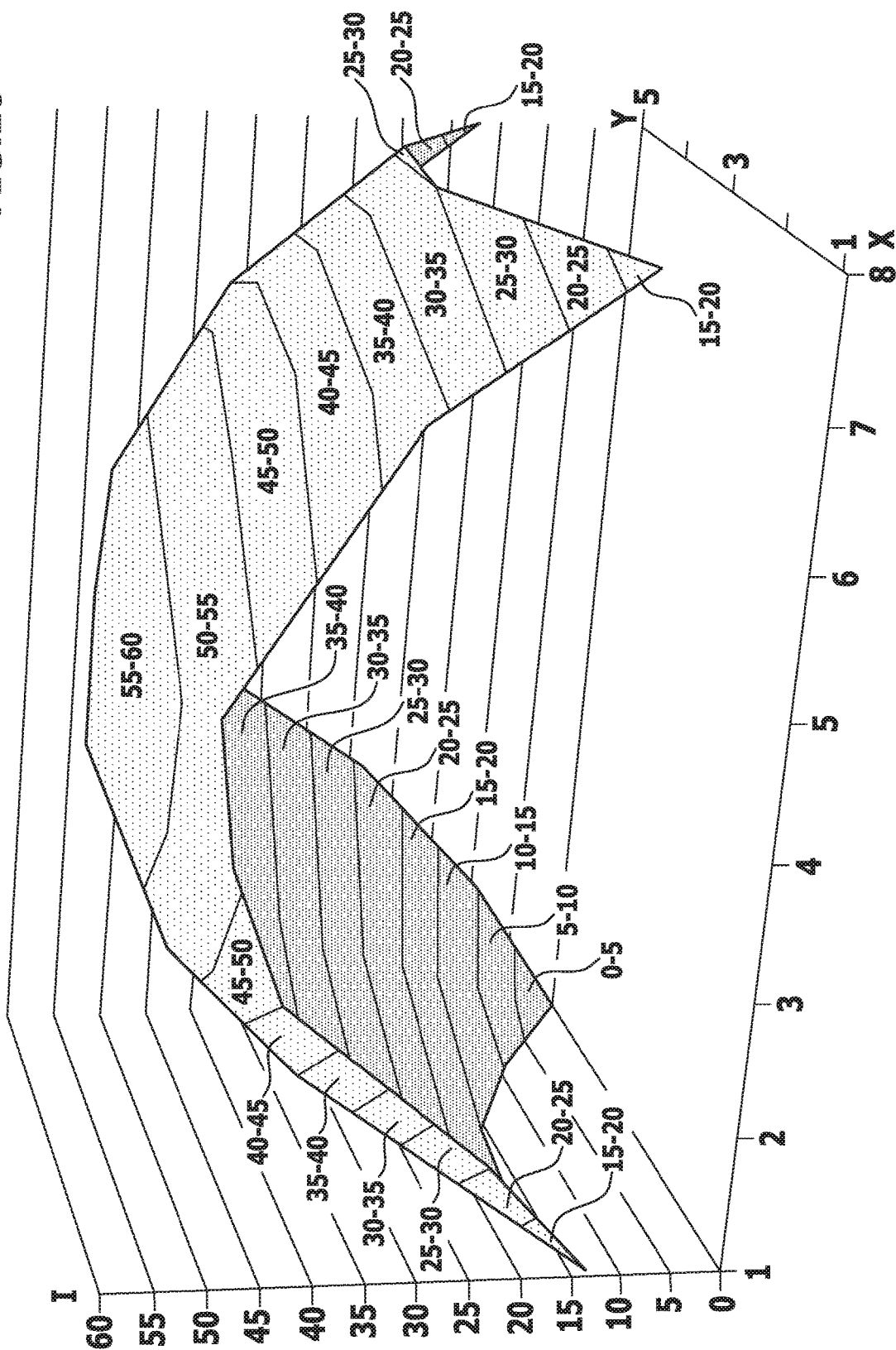
FIG. 10 shows a schematic representation of the intensity distribution of a radiation source.

Furthermore, as mentioned in the introduction, a problem to be solved is an inhomogeneous intensity distribution of the radiation 14 generated by the radiation source 18. If, for example, only a central region of a construction field in the image plane/construction plane 22 is used, then in a plane parallel to the image plane/construction plane 22, for example, an intensity distribution as shown schematically in FIG. 10 results. The intensity of the radiation 14 is thus highest in the centre of the construction field. However, the intensity of the radiation falls off continuously toward the edge of the construction field. In FIG. 10, schematically, the intensity is represented on the vertical axis, and the extent in a plane parallel to the image plane/construction plane 22 of the radiation field is formed by an x-y plane.

If, for example, for forming an object layer, only the central region of the construction field is used which corresponds to the region of the maximum and most even intensity distribution of the radiation 14, this region consequently does not have to be suppressed to the lowest intensity value which is typically found in the corners of the radiation field. In this way, valuable exposure time can be gained and thus the construction time for forming the object 12 can be reduced. With suitable image processing software, which runs on the computer 38, an exposure mask can be individually controlled for each object layer by means of the calculated 2-bit bitmap 30 which suffices with the smallest exposure attenuation value in order to expose the respective cross-sectional area of the object in the shortest time. This effect is shown schematically in FIGS. 11 and 12.

Figure 11:
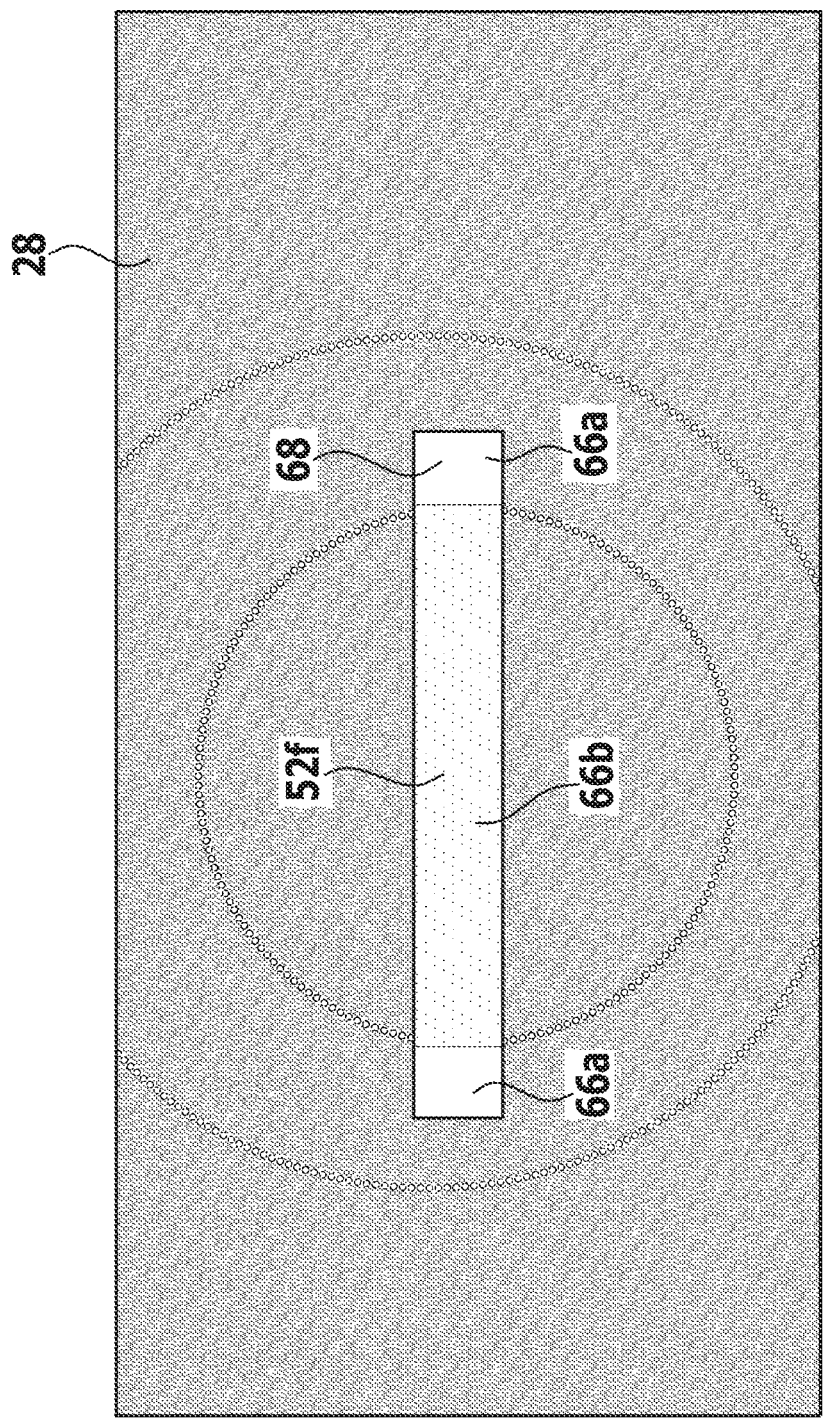
FIG. 11 shows a schematic representation of an exposure mask taking account of the intensity distribution of the radiation source.

Account is taken in FIG. 11 of the fact that the structure 68 to be exposed is exposed exclusively in the region of the two highest intensity steps, which are symbolised by the dotted circles. Therefore, the level of the exposure is adapted to the lowest of these two intensity steps. This means that pixels with the bit-value 32 "transparent" can be assigned to the surface regions 66a and only the surface region 66b which is situated in the region of the radiation field with the highest intensity in the range between 55 and 60 is attenuated by 10% by filling, for example, with the exposure texture 52f.

Figure 12:
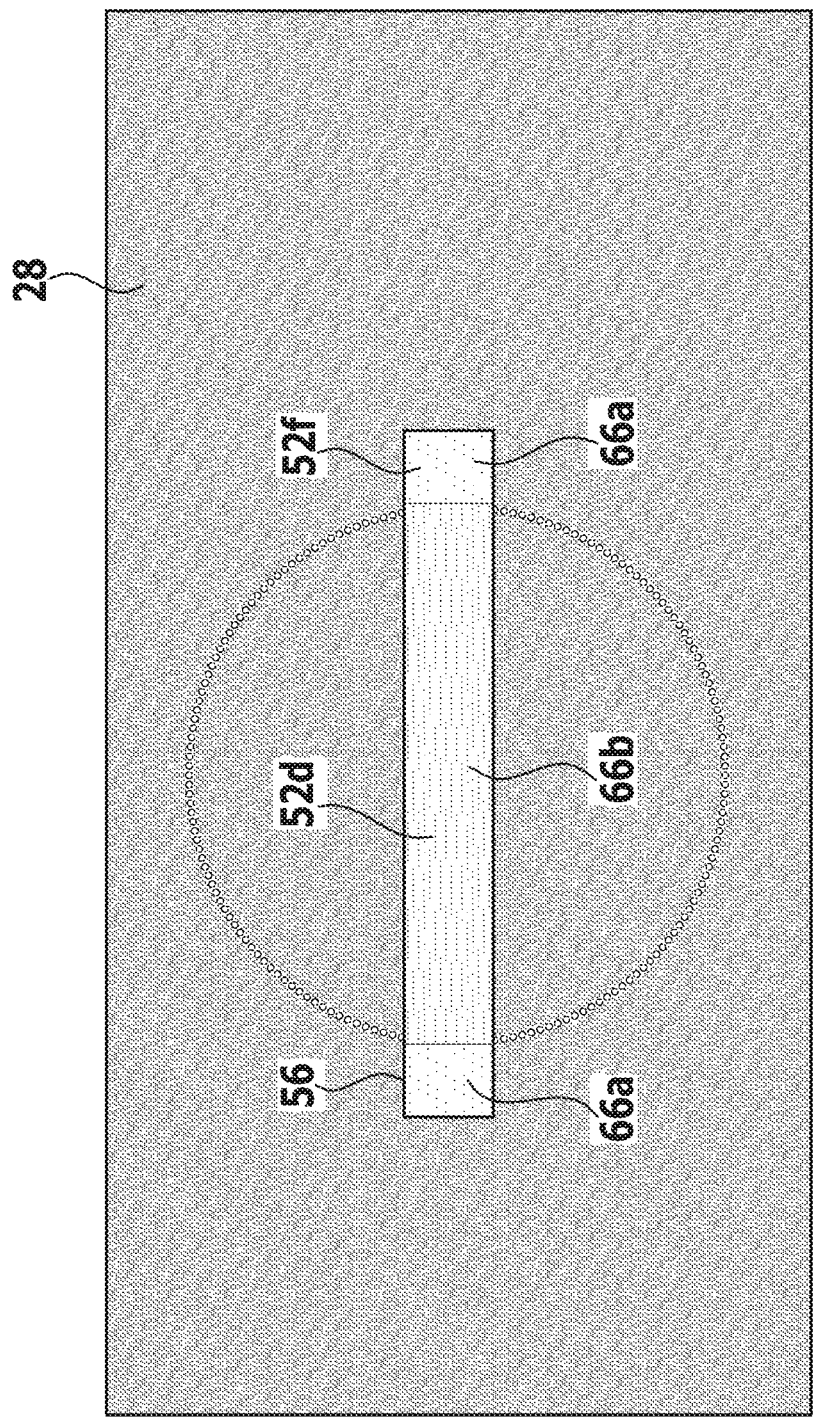
FIG. 12 shows a schematic representation of an exposure mask without taking account of the intensity distribution of the radiation source.

In contrast thereto, for the exposure mask 28 in FIG. 12, if the exposure is matched to corners of the image field, the result is for example, the exposure texture 52f for the surface regions 66a and the exposure texture 52d for the surface region 66b. In other words, without taking into account that only in the centre of the radiation field generated by the radiation source 18 does an exposure take place, a darkening turns out significantly greater so that the exposure time of this object layer is significantly increased, for example, with the masks 28 shown schematically in FIGS. 11 and 12, by 20%.

Figure 13:
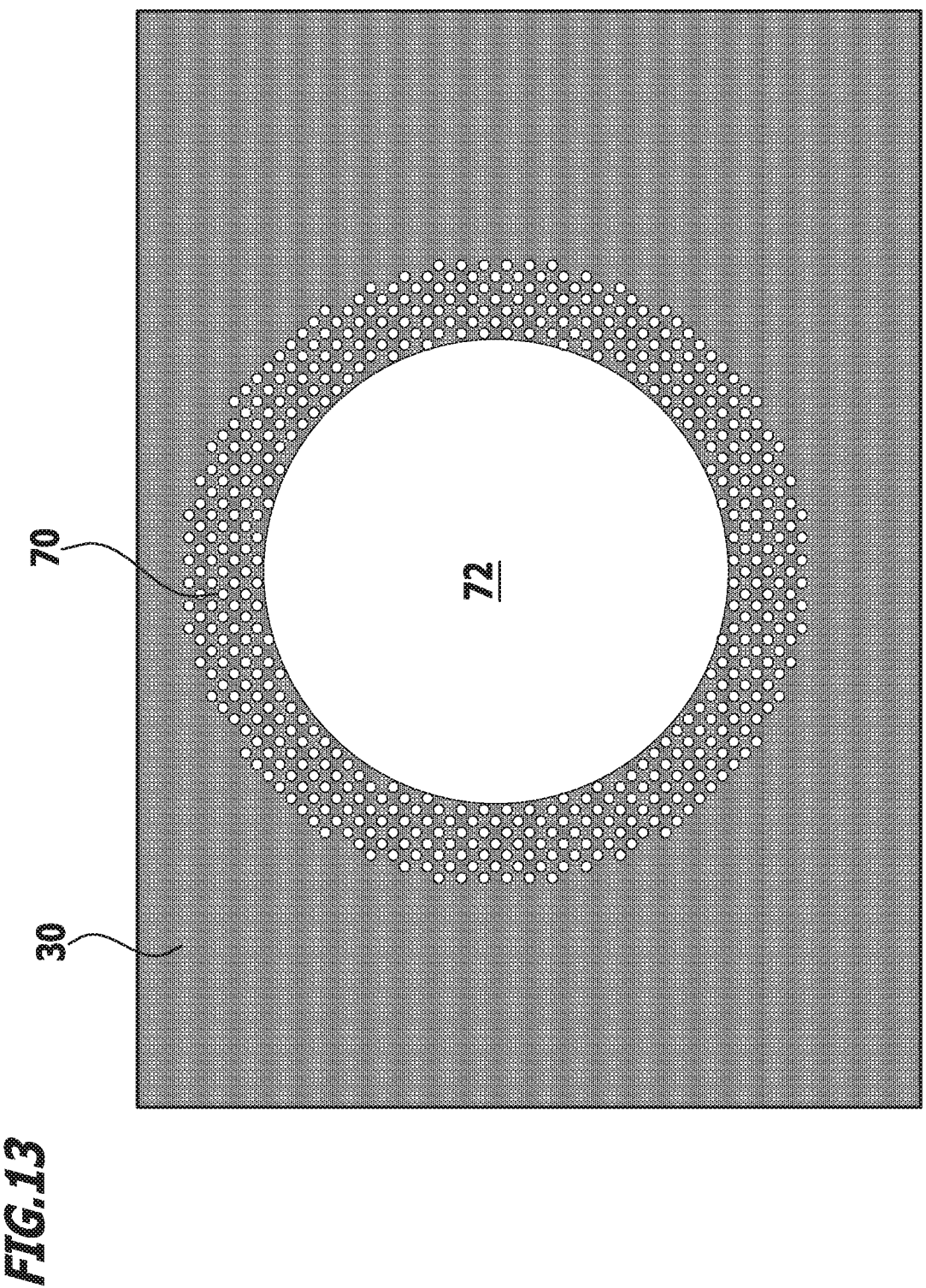
FIG. 13 shows a schematic representation of an exposure of a circular plate with schematically represented scattered light in the edge region.

In order to improve a surface quality of the object 12, it is advantageous if particularly also scattered light effects in the edge region of structures are taken into account. If a circular structure 72 is, for example, fully exposed, that is the bit-value 32 "transparent" is assigned to all the pixels of the associated 2-bit bitmap 30, in the edge region, strong scattered light effects arise, as shown schematically in FIG. 13. The scattered light 70 surrounds the circular structure 72 in the manner of a corona and leads to undefined edge regions of the exposure.

Figure 14:
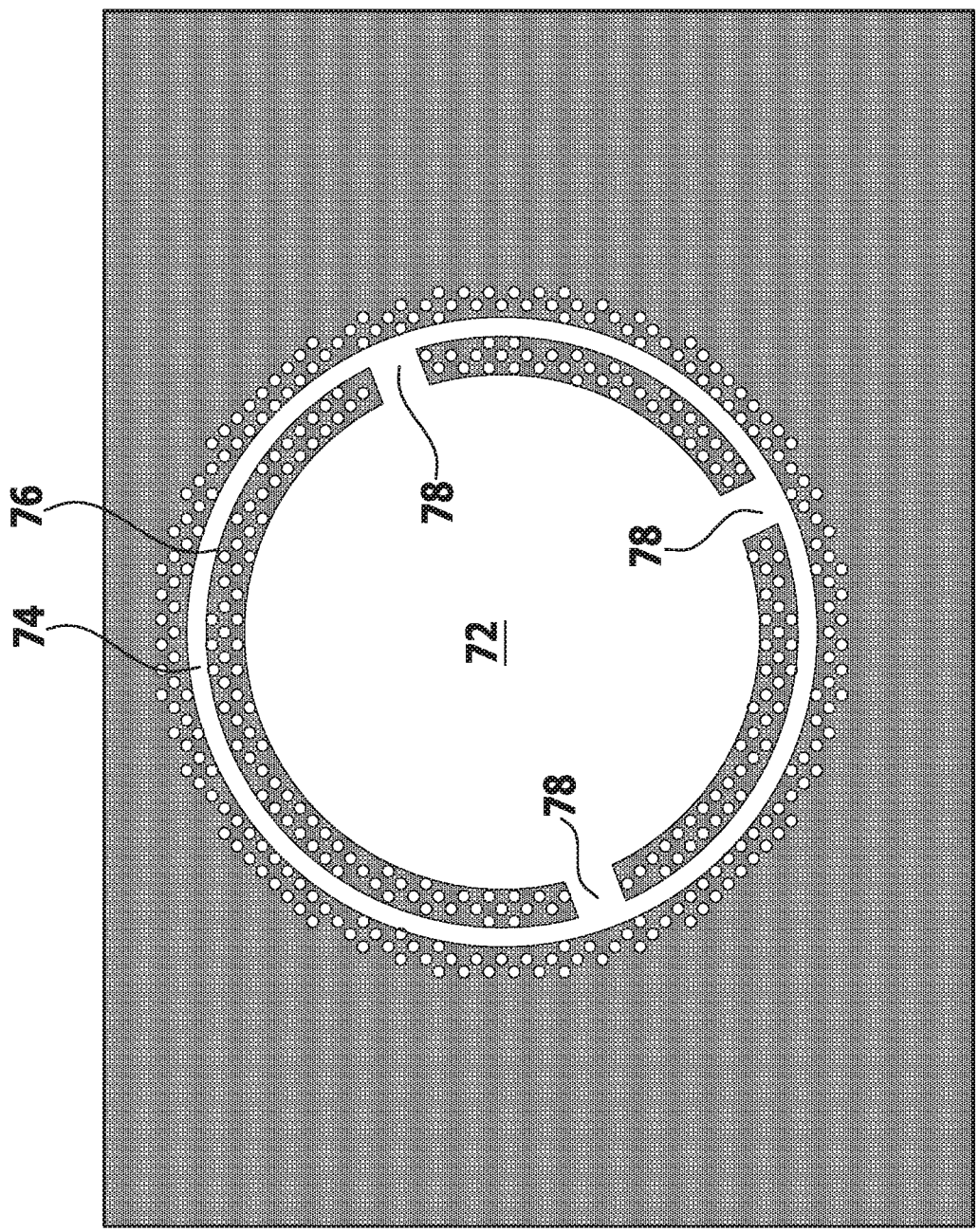
FIG. 14 shows a schematic representation similar to FIG. 13, but using an outer contour line with a separating line bordering thereon and a schematic representation of a lessening of the scattered light.

In order to cancel out these disadvantages, a contour line 74 which externally borders the respective cross-section of the structure 72 is separated from the rest of the areal structure by a separating line 76. In this way, scattered light effects can be significantly reduced, as shown schematically in FIG. 14. By means of the contour line 74, a clear delimitation of a surface region can be achieved. The contour line is preferably 2 to 8 pixels wide, advantageously 2 to 4 pixels.

Optionally, connecting lines 78 can be provided which interrupt the separating line 76 and connect the contour line 74 to the areal structure 72 in order to ensure the required stability of the object 12 overall. In particular, with separating lines 76 having a width of not more than 8 pixels, these connecting lines 78 have hardly any effects on the scattered light reduction achieved by means of the separating line 76.

As previously explained in the introduction, two or more separating lines 76 can be provided which extend parallel to one another and are each separated from one another by a continuous contour line. Similarly, the arrangement as described of a separating line in the region of an outer contour of a structure 72 can be provided for recesses in an object layer, that is for non-exposed structures. These can then be surrounded from outside by a contour line 74 which itself is surrounded by a separating line 76 in order to delimit the recess relative to a larger structure to be exposed and to minimise the occurrence of scattered light. In particular, for small recesses in an object layer, it is only then possible to form these with the desired dimensions.

In order to improve the outer and inner surfaces of the object 12, the device 10 can optionally comprise an oscillation device 80. This can be coupled to the imaging optical system 20, as shown schematically in FIG. 2. Alternatively, it is also possible to couple said oscillation device to the plate 48 or the carrier plate 42. It is also conceivable to couple the mask unit 24 to the oscillation device 80. The oscillation device 80 is preferably configured in the form of a mechanical oscillation device 80 in order to achieve an oscillating exposure in the image plane/construction plane 22.

Figure 15:
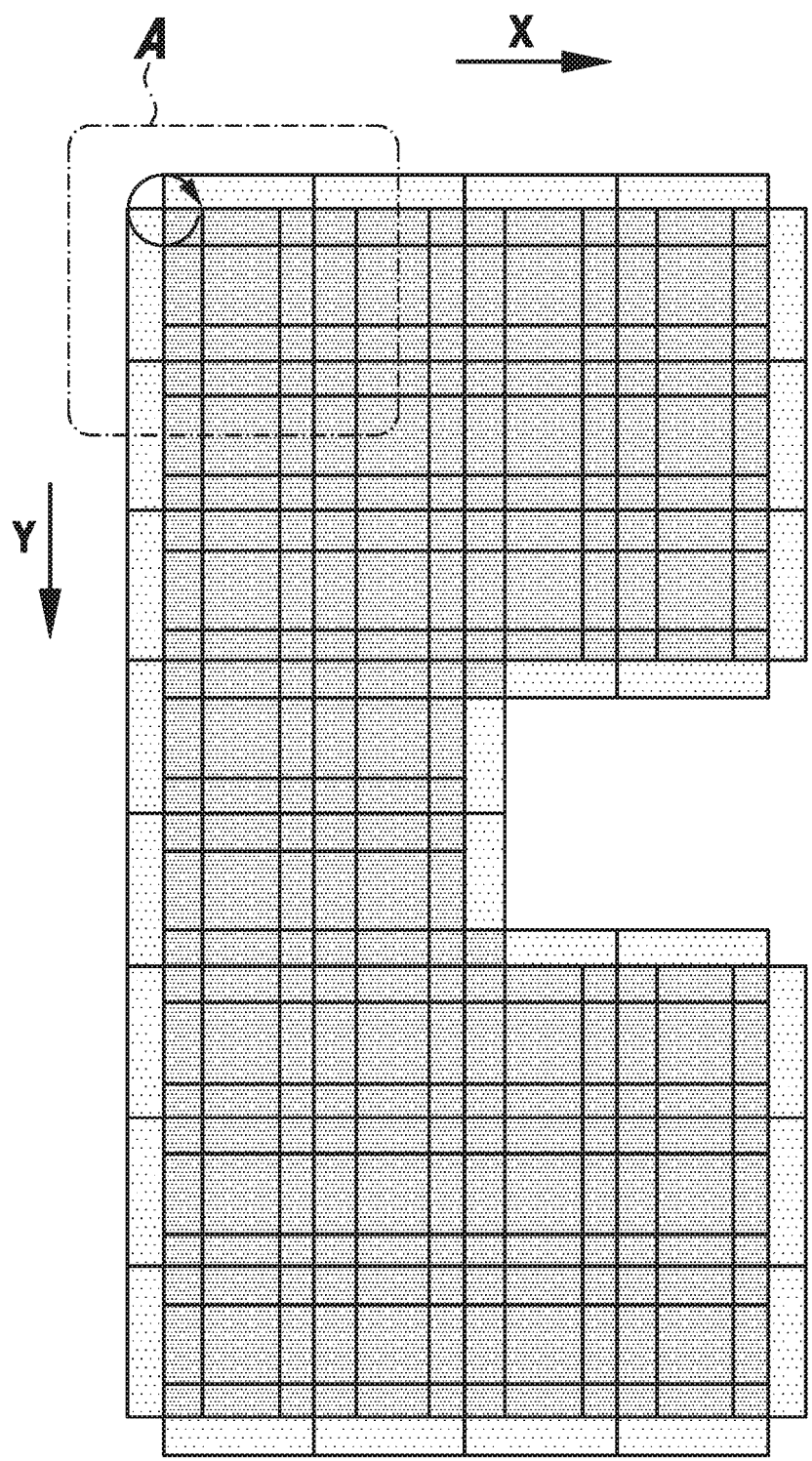
FIG. 15 shows a schematic representation of a circular oscillation of an exposure mask in the sub-pixel range.
Figure 16:
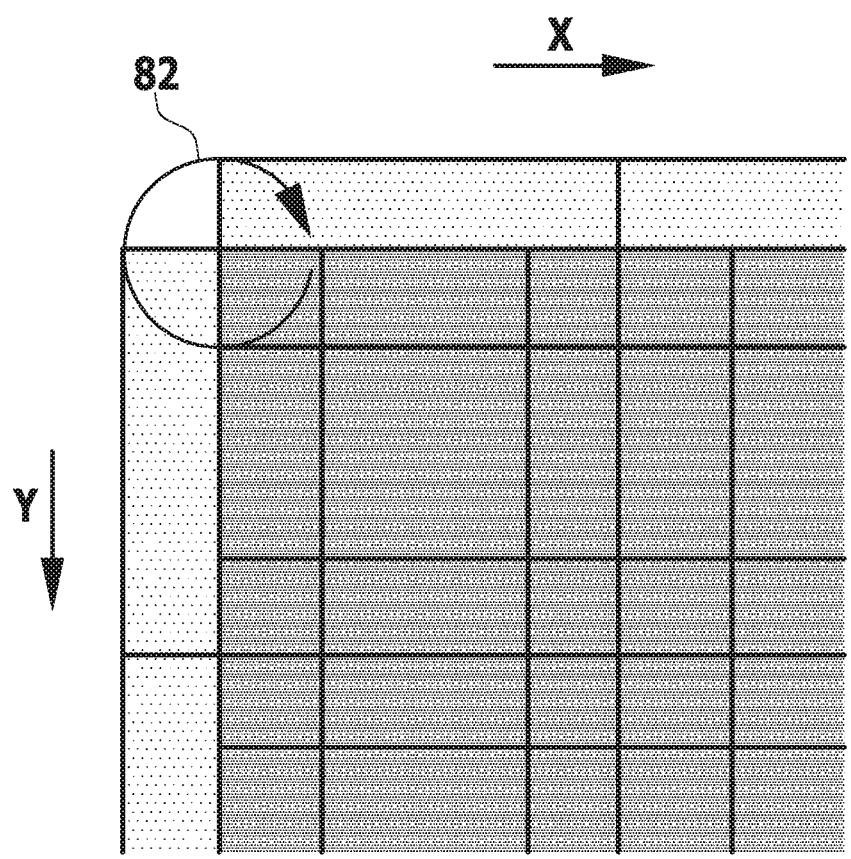
FIG. 16 shows an enlarged view of the region A in FIG. 15.

The oscillation device 80 is preferably configured to overlay an oscillation of the exposure in an x-direction and/or a y-direction in a plane parallel to the image plane/construction plane 22. Preferably, the oscillation displacement lies in a region of less than 1 pixel, but ideally it is 0.25 pixel. With this, as shown schematically in FIGS. 15 and 16 by the arrow 82, a circular movement of the radiation field defined by the mask unit 24 in the image plane/construction plane 22 relative to the last formed object layer can be created. In this way, a partial overlaying results during the exposure in the contour region. If, for example, during the exposure time of an object layer, one or more oscillation cycles are carried out, then all the outer and inner corners and edges are rounded with the corresponding radius of the circle defined by the oscillation.

Figure 17:
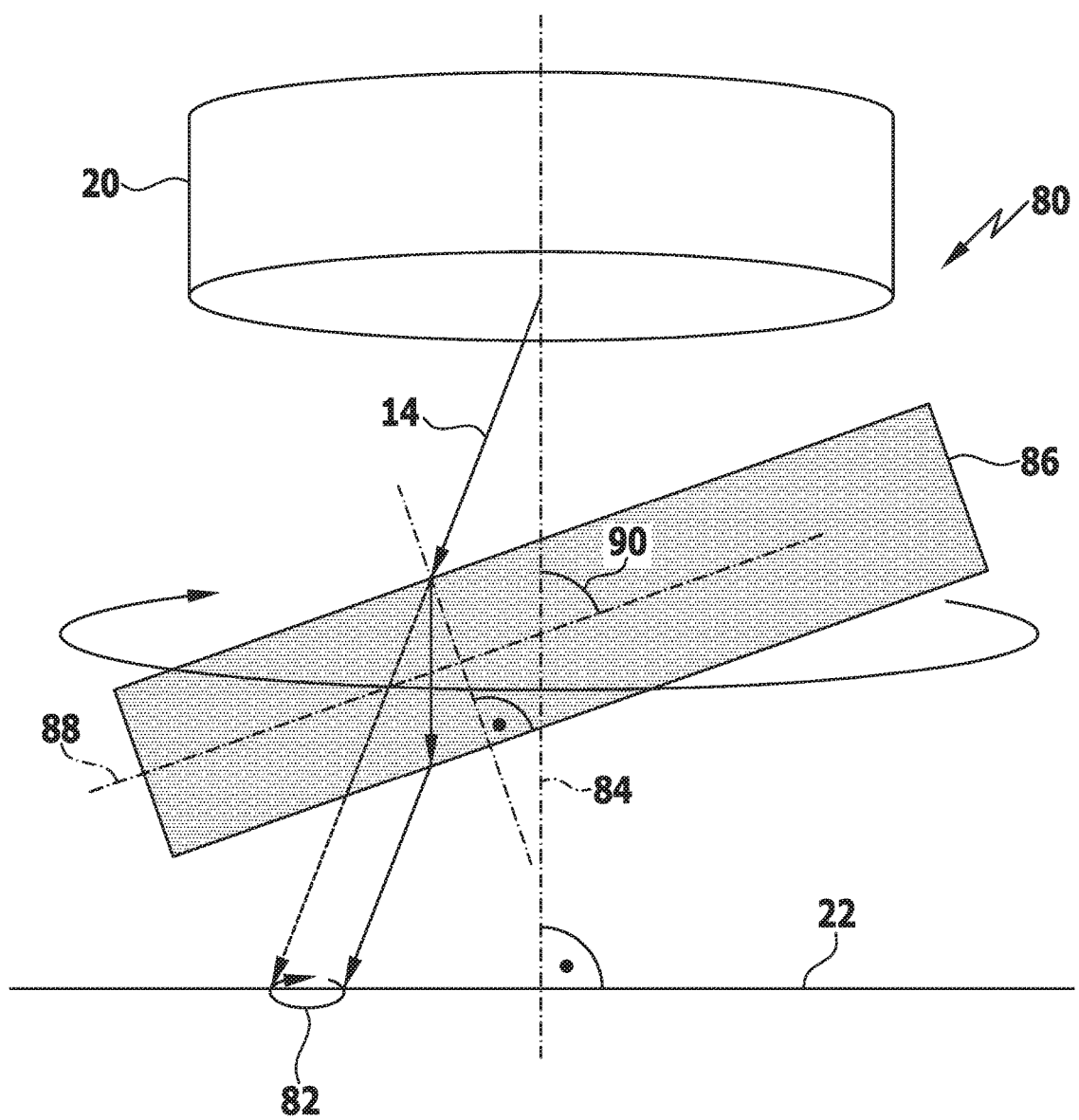
FIG. 17 shows a schematic representation of a further exemplary embodiment of an oscillation device.

In particular, the oscillation device 80 can comprise a plane-parallel plate 86, as shown schematically in FIG. 17, which is rotated about a rotation axis 84 which is tilted relative to the image plane/construction plane 22 by an angle of 90° or substantially 90°. However, the plate 86 which defines a plate plane 88 is inclined relative to the image plane/construction plane 22 such that the plate plane 88 includes an angle 90 with the rotation axis 84 differing from 90°. Due to the rotation of the disk 86, as shown schematically in FIG. 17, a circular movement represented by the arrow 82 of the radiation field defined by the mask unit 24 in the image plane/construction plane 22 relative to the last formed object layer is realised, specifically due to the refraction of the radiation 14 at the plate 86.

It is therefore possible, in particular, by means of the oscillation device 80 with a single exposure mask 28, by means of oscillation, for example, of said mask or the carrier plate 42 during a single exposure cycle, to achieve an edge smoothing in the subpixel region. The plane-parallel glass plate can be arranged, in particular, in the ray path between a digital micromirror unit and the imaging optical system 20 or between the imaging optical system and the image plane/construction plane 22. In contrast to the prior art disclosure, a multiple exposure is therefore not necessary. Rather, a deliberately unsharp projection with a single exposure mask is undertaken without brightness control of the individual pixels, by means of the oscillation, in order to achieve the edge smoothing. This procedure requires no computational effort since no further bitmaps with pixel offsets, as known, for example, from the prior art, have to be calculated.

What is claimed is:

1. Method for producing a three-dimensional object by layer by layer solidifying of a material which is solidifiable under the action of radiation, making use of exposure masks, wherein in order to form each object layer to be solidified of the object in a construction plane, there is generated at least one digital exposure mask by means of which the radiation is selectively projected into the construction plane, wherein for each exposure mask, according to the object layer to be solidified, a single 2-bit bitmap is calculated via a computer unit which assigns either the bit-value "transparent" or the bit-value "non-transparent" to each pixel of the exposure mask, wherein the bit-value "transparent" is assigned to at least one surface region of the 2-bit bitmap having a structure size below a limit structure size and wherein an exposure texture is assigned to each surface region above the limit structure size, said exposure texture being configured in the form of a pattern of pixels with the bit-values "transparent" and "non-transparent".

2. Method according to claim 1, wherein the exposure texture has at most as many pixels with the bit-value "non-transparent" as pixels with the bit-value "transparent".

3. Method according to claim 1, wherein each exposure texture has an exposure attenuation value which is greater than 0 and not more than 0.5.

4. Method according to claim 1, wherein the exposure texture is assigned to at least one surface region with a structure size above the limit structure size, depending on the structure size of said surface region and wherein, with increasing structure size, the exposure attenuation value of the exposure texture increases.

5. Method according to claim 1, wherein identical exposure textures of exposure masks for exposing successive object layers are arranged in a plane parallel to the construction plane offset relative to one another by a whole number of pixels in at least one of an x-direction and a y-direction of the plane parallel to the construction plane.

6. Method according to claim 1, wherein different texture patterns for forming the exposure textures are provided, said texture patterns having a ratio of pixels with the bit-value "non-transparent" and of pixels with the bit-value "transparent" lying in the range between 0 and 1.

7. Method according to claim 1, wherein each exposure texture is configured in the form of a hatching or a regular pattern.

8. Method according to claim 1, wherein only exposure textures are used for which, at most, corners of pixels with the bit-value "non-transparent" meet one another, but no longitudinal edges of pixels with the bit-value "non-transparent" adjoin one another.

9. Method according to claim 1, wherein each exposure texture is convertible into itself by a translation in a plane parallel to the construction plane.

10. Method according to claim 1, wherein a closed edge line is assigned to each exposure area which defines a cross-sectional area of the object in each exposure mask for each outer and inner contour of the exposure area and wherein the bit-value "transparent" is assigned to the pixels forming the edge line.

11. Exposure mask generating apparatus for a device for producing a three-dimensional object by layer by layer solidifying of a material which is solidifiable under the action of radiation, making use of exposure masks, said device for producing a three dimensional object comprising:
a radiation source for generating the radiation, and the exposure mask generating apparatus, which exposure mask generating apparatus, for forming each object layer to be solidified of the object in a construction plane, generates at least one exposure mask in the form of a digital exposure mask by means of which the radiation is selectively projected into the construction plane, wherein the exposure mask generating apparatus comprises:
a computer unit configured for:
(a) calculating a single 2-bit bitmap for each of the at least one digital exposure masks according to the object layer to be solidified,
said 2-bit bitmap assigning to each pixel of the at least one digital exposure mask either the bit-value "transparent" or the bit-value "non-transparent",
(b) assigning the bit-value "transparent" to each surface region of the at least one digital exposure mask defined by the 2-bit bitmap with a structure size below a limit structure size, and
(c) assigning an exposure texture to each surface region of the at least one digital exposure mask above the limit structure size,
said exposure texture being configured in the form of a pattern of pixels with the bit-values "transparent" and "non-transparent".

12. Exposure mask generating apparatus according to claim 11, wherein:
said exposure texture has at most as many pixels with the bit-value "non-transparent" as pixels with the bit-value "transparent".

13. Exposure mask generating apparatus according to claim 11, wherein:
said exposure texture has an exposure attenuation value, and
said exposure attenuation value is greater than 0 and not more than 0.5.

14. Exposure mask generating apparatus according to claim 11, wherein:
the computer unit is configured for assigning the exposure texture to each surface region with a structure size above the limit structure size, depending on the structure size of said surface region, and
with increasing structure size, the exposure attenuation value of the exposure texture increases.

15. Exposure mask generating apparatus according to claim 11, wherein:
the computer unit is configured for offset arrangement of identical exposure textures of each of the at least one digital exposure masks for exposing successive object layers in a plane parallel to the construction plane offset relative to one another by a whole number of pixels in at least one of an x-direction and a y-direction of the plane parallel to the construction plane.

16. Exposure mask generating apparatus according to claim 11, wherein:
the exposure mask generating apparatus provides different texture patterns for forming the exposure textures, and
said texture patterns having a ratio of pixels with the bit-value "non-transparent" and of pixels with the bit-value "transparent" lying in a range between 0 and 1.

17. Exposure mask generating apparatus according to claim 11, wherein:
the exposure mask generating apparatus provides each exposure texture in the form of a hatching or a regular pattern.

18. Exposure mask generating apparatus according to claim 11, wherein:
the computer unit is configured to use exclusively exposure textures for which:
(a) at most, corners of pixels with the bit-value "non-transparent" meet one another, and
(b) but no longitudinal edges of pixels with the bit-value "non-transparent" adjoin one another.

19. Exposure mask generating apparatus according to claim 11, wherein:
the exposure mask generating apparatus is configured for providing exposure textures, and
said exposure textures which are convertible into themselves by a translation in a plane parallel to the construction plane.

20. Device for producing a three-dimensional object by layer by layer solidifying of a material which is solidifiable under the action of radiation, making use of exposure masks, comprising:
a radiation source for generating the radiation, and
an exposure mask generating apparatus,
wherein the exposure mask generating apparatus,
for forming each object layer to be solidified of the object in a construction plane,
generates at least one exposure mask in the form of a digital exposure mask by means of which the radiation is selectively projected into the construction plane,
wherein the exposure mask generating apparatus comprises:
a computer unit configured for:
(a) calculating a single 2-bit bitmap for each of the at least one digital exposure masks according to the object layer to be solidified,
said 2-bit bitmap assigning to each pixel of the at least one digital exposure mask either the bit-value "transparent" or the bit-value "non-transparent",
(b) assigning the bit-value "transparent" to each surface region of the at least one digital exposure mask defined by the 2-bit bitmap with a structure size below a limit structure size, and
(c) assigning an exposure texture to each surface region of the at least one digital exposure mask above the limit structure size,
said exposure texture being configured in the form of a pattern of pixels with the bit-values "transparent" and "non-transparent".

* * * * *